US012602476B2

(12) United States Patent  
Haak et al.

(10) Patent No.: US 12,602,476 B2  
(45) Date of Patent: Apr. 14, 2026

(54) SYSTEMS AND METHODS FOR FORENSIC RESOLUTION OF RANSOMWARE ATTACKS

(71) Applicant: Coveware Inc., Westport, CT (US)

(72) Inventors: Andreas Haak, Norwich (GB); Sarah Jane Wolstencroft, Norwich (GB); Alexander Holdtman, Westport, CT (US); Catherine Stamson, Westport, CT (US); Julia Cox, Westport, CT (US)

(73) Assignee: Coveware Inc., Westport, CT (US)

( * ) Notice: Subject to any disclaimer, the term of this patent is extended or adjusted under 35 U.S.C. 154(b) by 41 days.

(21) Appl. No.: 18/598,012

(22) Filed: Mar. 7, 2024

(65) Prior Publication Data

US 2025/0077669 A1     Mar. 6, 2025

Related U.S. Application Data

(60) Provisional application No. 63/450,789, filed on Mar. 8, 2023.

(51) Int. Cl.  
G06F 21/56          (2013.01)  
G06F 21/55          (2013.01)  
(Continued)

(52) U.S. Cl.  
CPC .......... G06F 21/565 (2013.01); G06F 21/554 (2013.01); G06F 21/602 (2013.01); H04L 63/1416 (2013.01); G06F 2221/034 (2013.01)

(58) Field of Classification Search  
CPC .... G06F 21/565; G06F 21/554; G06F 21/602; G06F 2221/034; H04L 63/1416  
See application file for complete search history.

(56) References Cited

U.S. PATENT DOCUMENTS 10,055,582 B1      8/2018   Weaver et al.  
10,693,901 B1 *    6/2020   Chan ....................... H04L 67/02  
(Continued)

FOREIGN PATENT DOCUMENTS

WO      WO 2020/006415 A1      1/2020

OTHER PUBLICATIONS

International Search Report and Written Opinion of the International Searching Authority for International Application No. PCT/US24/18819, mailed Jul. 30, 2024, 18 pages.  
(Continued)

*Primary Examiner* — Viet D Vu  
(74) *Attorney, Agent, or Firm* — Sterne, Kessler, Goldstein & Fox P.L.L.C.

(57)                ABSTRACT

Systems and methods for forensic resolution of ransomware attacks are provided. The systems and methods define a platform and functionality for addressing ransom based attacks. According to one aspect, the platform and functionality provides a suite of programs and services that enable verification of "ransomed" files to ensure that they can in fact be recovered. If an attack has compromised the integrity of the underlying data so that it cannot be recovered, paying the ransom is an exercise in futility. Additional aspects provide for rapid collection of data that is targeted and specific and that further enables efficient forensic analysis. Many conventional approaches in this space fail to capture requisite detail and/or fail to provide a methodology for handling the volumes of data required to efficiently and effectively track or resolve such attacks. Further aspects provide actionable intelligence that drives result oriented goals for ransomed data and/or compromised systems.

18 Claims, 12 Drawing Sheets

(51) Int. Cl.
   *G06F 21/60*        (2013.01)
   *H04L 9/40*         (2022.01)

(56) References Cited

U.S. PATENT DOCUMENTS

| | | | |
|---|---|---|---|
| 10,715,533 B2 | 7/2020 | Iwanir et al. | |
| 10,791,133 B2 | 9/2020 | Shukla et al. | |
| 11,409,868 B2 | 8/2022 | Reid et al. | |
| 11,520,886 B2 | 12/2022 | Levy et al. | |
| 11,755,736 B1 | 9/2023 | Vasudeva et al. | |
| 2002/0108034 A1 | 8/2002 | Hashem et al. | |
| 2008/0320319 A1 | 12/2008 | Muller et al. | |
| 2012/0159518 A1 | 6/2012 | Boliek et al. | |
| 2016/0259567 A1 | 9/2016 | Webster | |
| 2017/0034189 A1 | 2/2017 | Powell | |
| 2018/0114020 A1 | 4/2018 | Hirschberg et al. | |
| 2018/0181761 A1 | 6/2018 | Sinha et al. | |
| 2019/0079806 A1 | 3/2019 | Ragland et al. | |
| 2019/0342298 A1 | 11/2019 | Chen et al. | |
| 2020/0082084 A1* | 3/2020 | Kallos | G06F 21/602 |
| 2020/0089876 A1 | 3/2020 | Aharoni et al. | |
| 2020/0097653 A1 | 3/2020 | Mehta et al. | |
| 2020/0139631 A1 | 5/2020 | Buller et al. | |
| 2021/0026961 A1 | 1/2021 | Underwood et al. | |
| 2021/0097181 A1 | 4/2021 | Reid et al. | |
| 2021/0117544 A1 | 4/2021 | Kurtz et al. | |
| 2021/0216631 A1 | 7/2021 | Child et al. | |
| 2021/0357504 A1 | 11/2021 | Saad et al. | |
| 2022/0035920 A1 | 2/2022 | Thomas | |
| 2022/0131879 A1 | 4/2022 | Naik et al. | |
| 2024/0007491 A1* | 1/2024 | Spurlock | G06F 21/554 |
| 2025/0063054 A1 | 2/2025 | Vipat et al. | |
| 2025/0077662 A1 | 3/2025 | Haak et al. | |
| 2025/0077663 A1 | 3/2025 | Haak et al. | |

OTHER PUBLICATIONS

Wikipedia 1, Mount computing, accessed on Mar. 6, 2023 (Year: 2023); 2 pages.
Wikipedia 2, Breadth-first search, accessed on Mar. 6, 2023 (Year: 2023); 5 pages.

* cited by examiner

Figure 1:
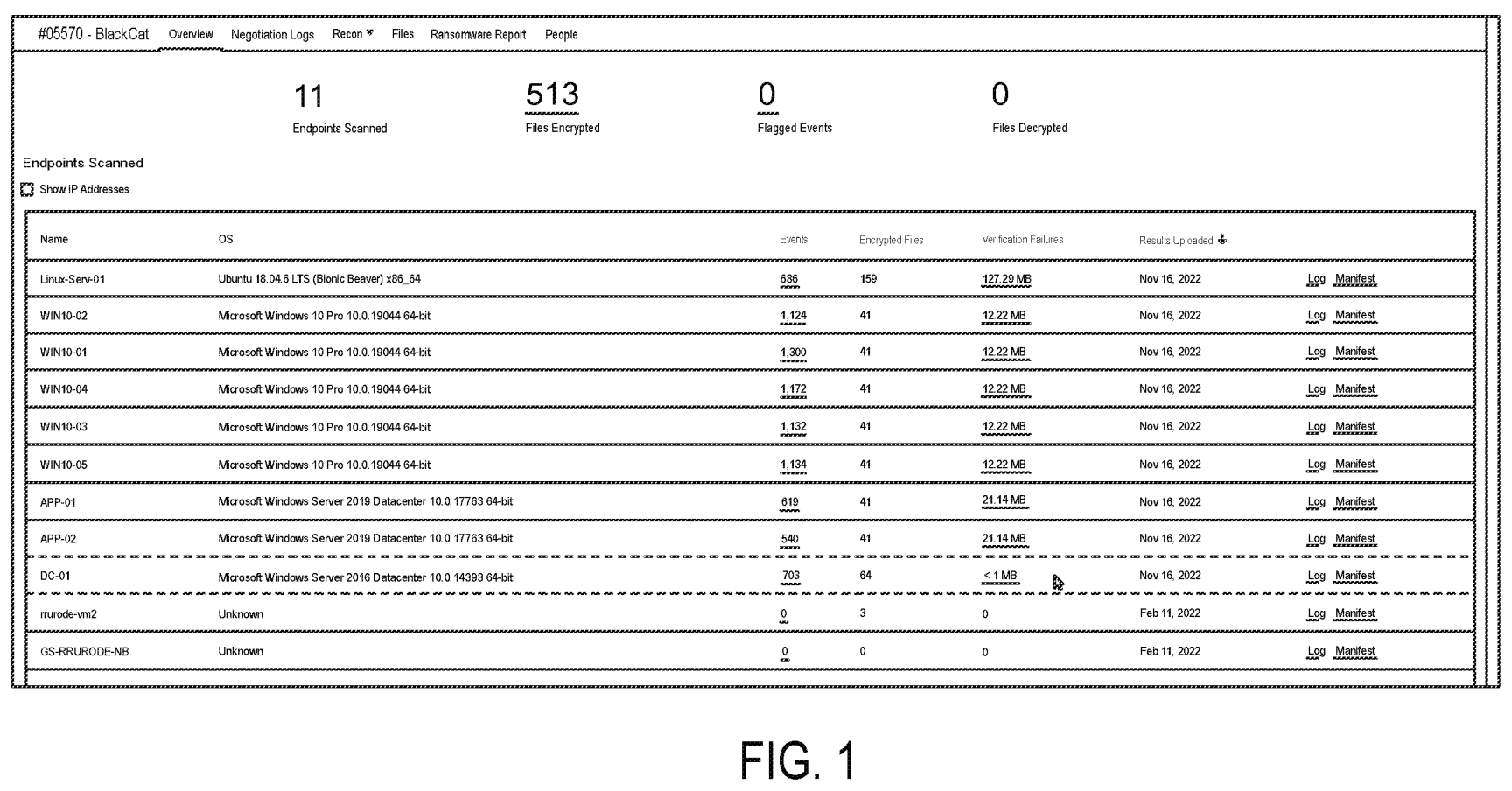

05570 - BlackCat    Overview    Negotiation Logs    Recon ⌄    Files    Ransomware Report    People

| 11 | 513 | 0 | 0 |
|---|---|---|---|
| Endpoints Scanned | Files Encrypted | Flagged Events | Files Decrypted |

Endpoints Scanned
☐ Show IP Addresses

| Name | OS | Events | Encrypted Files | Verification Failures | Results Uploaded ⬇ | | |
|---|---|---|---|---|---|---|---|
| Linux-Serv-01 | Ubuntu 18.04.6 LTS (Bionic Beaver) x86_64 | 686 | 159 | 127.29 MB | Nov 16, 2022 | Log | Manifest |
| WIN10-02 | Microsoft Windows 10 Pro 10.0.19044 64-bit | 1,124 | 41 | 12.22 MB | Nov 16, 2022 | Log | Manifest |
| WIN10-01 | Microsoft Windows 10 Pro 10.0.19044 64-bit | 1,300 | 41 | 12.22 MB | Nov 16, 2022 | Log | Manifest |
| WIN10-04 | Microsoft Windows 10 Pro 10.0.19044 64-bit | 1,172 | 41 | 12.22 MB | Nov 16, 2022 | Log | Manifest |
| WIN10-03 | Microsoft Windows 10 Pro 10.0.19044 64-bit | 1,132 | 41 | 12.22 MB | Nov 16, 2022 | Log | Manifest |
| WIN10-05 | Microsoft Windows 10 Pro 10.0.19044 64-bit | 1,134 | 41 | 12.22 MB | Nov 16, 2022 | Log | Manifest |
| APP-01 | Microsoft Windows Server 2019 Datacenter 10.0.17763 64-bit | 619 | 41 | 21.14 MB | Nov 16, 2022 | Log | Manifest |
| APP-02 | Microsoft Windows Server 2019 Datacenter 10.0.17763 64-bit | 540 | 41 | 21.14 MB | Nov 16, 2022 | Log | Manifest |
| DC-01 | Microsoft Windows Server 2016 Datacenter 10.0.14393 64-bit | 703 | 64 | <1 MB ⚠ | Nov 16, 2022 | Log | Manifest |
| rrurode-vm2 | Unknown | 0 | 3 | 0 | Feb 11, 2022 | Log | Manifest |
| GS-RRURODE-NB | Unknown | 0 | 0 | 0 | Feb 11, 2022 | Log | Manifest |

CASE/BUILDER
MANAGER

804

DATA CAPTURE
COMPONENT

806

ANALYSIS
COMPONENT

808

INTERFACE
MANAGER

Deploy & Collect

Verify & Forecast Recovery (< 1 hour)

Analyze

⇧ Identifies corruption or non-encrypted files

⇧ Catalogs all systems and volumes that are impacted

⇧ Data Recovery forecasted to the file level -> adjust/pivot strategy

Recon
*Forensic Triage*

Verification Failures for RB-MP-SQL01

| Drive | Ransom Id | Size (Bytes) | File Name |
|---|---|---|---|
| F:\ | .avos2 | 4,599,340,544 | F:\MSSQL10.MSSQLSERVER\MSSQL\Backup\Liberty\Liberty_backup_2022_01_31_220037_2286095.bak.avos2<br>• 24576344 corrupted bytes at offset 0x1001a8000 |
| F:\ | .avos2 | 4,599,340,544 | F:\MSSQL10.MSSQLSERVER\MSSQL\Backup\Liberty\Liberty_backup_2022_02_01_220032_8843864.bak.avos2<br>• 24576344 corrupted bytes at offset 0x1001a8000 |
| F:\ | .avos2 | 4,599,340,544 | F:\MSSQL10.MSSQLSERVER\MSSQL\Backup\Liberty\Liberty_backup_2022_02_02_220037_0100102.bak.avos2<br>• 24576344 corrupted bytes at offset 0x1001a8000 |
| F:\ | .avos2 | 4,599,340,544 | F:\MSSQL10.MSSQLSERVER\MSSQL\Backup\Liberty\Liberty_backup_2022_02_03_220034_2639184.bak.avos2<br>• 24576344 corrupted bytes at offset 0x1001a8000 |
| F:\ | .avos2 | 4,599,340,544 | F:\MSSQL10.MSSQLSERVER\MSSQL\Backup\Liberty\Liberty_backup_2022_02_04_220038_0975130.bak.avos2<br>• 24576344 corrupted bytes at offset 0x1001a8000 |
| F:\ | .avos2 | 7,101,299,200 | F:\MSSQL10.MSSQLSERVER\MSSQL\Backup\OpManager\OpManagerDB_backup_2022_02_06_223001_0331833.bak.avos2<br>• 251904344 corrupted bytes at offset 0x1001a8000 |
| F:\ | .avos2 | 10,710,565,376 | F:\MSSQL10.MSSQLSERVER\MSSQL\Backup\viewevents-17_12_2018_pre-upgrade(1).bak.avos2<br>• 575584344 corrupted bytes at offset 0x1001a8000 |

SYSTEMS AND METHODS FOR FORENSIC RESOLUTION OF RANSOMWARE ATTACKS

RELATED APPLICATIONS

This application claims priority under 35 U.S.C. § 119 (e) to U.S. Provisional Patent Application No. 63/450,789, filed Mar. 8, 2023, entitled "SYSTEMS AND METHODS FOR FORENSIC RESOLUTION OF RANSOMWARE ATTACKS", which is incorporated by reference herein in its entirety.

COPYRIGHT NOTICE

BACKGROUND

Bad actors are prevalent in the digital world, and impose huge costs and burdens on any organization that operates in this space. Any electronic medium, database, data store, etc. is subject and vulnerable to these bad actors. Ransomware represents a growing threat in this space, where malicious code is used to encrypt or obscure source data. The ability to recover that data becomes the ransom target.

SUMMARY

Various conventional practices exist to mitigate this type of attack however, it is realized that conventional approaches are simply not enough. Accordingly, systems and methods for forensic resolution of ransomware attacks are provided. The systems and methods define a platform and functionality for addressing ransom based attacks. According to one aspect, the platform and functionality provides a novel suite of programs and services that, for example, enable verification of "ransomed" files to ensure that they can in fact be recovered. If an attack has compromised the integrity of the underlying data so that it cannot be recovered, paying the ransom is an exercise in futility. Additional aspects provide for rapid (e.g., real or near-real time) collection of data that is targeted and specific and that further enables efficient forensic analysis. Many conventional approaches in this space fail to capture requisite detail and/or fail to provide a methodology for handling the volumes of data required to efficiently and effectively track or resolve such attacks. Further aspects provide actionable intelligence that drives result oriented goals for ransomed data and/or compromised systems.

Other aspects provide for universal decryption capability, that is exercisable against multitudes of ransomware variants. For example, the platform is configured to analyze and identify various ransomware attacks based on analyzing the affected data and/or attack information collected by the system. In some embodiments, the platform can address multiple ransomware variants occurring in the same attack. Various conventional approaches deliver one to one solutions to ransomware variants, and lack the ability to address different ransomware variants holistically. Various conventional systems also lack the capability to handle multi-variants in single attacks. In further example, universal decryption capabilities extend through various operating systems, including LINUX/ESXi support, which is currently unavailable in conventional solutions. According to some embodiments, the universal decryption capability provided also outperforms various known approaches, processing decryption operations more efficiently than various threat actor tools that are currently available (e.g., ~75% faster). Other embodiments provide coverage of a multitude of ransomware variants that conventional systems do not achieve through respective plugins and/or features.

According to one aspect, a system for managing cyberattacks is provided. The system comprises at least one processor operatively connected to a memory, the at least one processor configured to verify an integrity of ransomware encrypted files, organize candidate attack files into classification categories, capture a time window of incident data to enable forensic analysis, and generate tailored visualizations, the visualizations configured to identify forensic features of interest in large volumes of data, and remediation actions associated with respective forensic features, and trigger the system to execute a remediation action responsive to selection in the user interface.

According to one embodiment, the at least one processor is further configured to verify the integrity of ransomware encrypted files based on reverse engineered rules associated with an encrypted file format or attack vector. According to one embodiment, the at least one processor is configured to execute at least one rule to: determine a match between bytes at a specified offset and a hardcoded file marker, determine a numeric value at a specified offset falls within a specified range or set of permissible values (e.g. block size, encrypted data size, encryption mode), determine a string at a specified offset matches a regular expression or other pattern (e.g. Base64 encoded blocks of text), determine a public key at a specified offset matches an expected format, which may include mathematical verification (e.g. check that integer components of an ECC key lie on the correct curve). According to one embodiment, the at least one processor is configured to execute statistical analysis to check entropy of one or more target regions of a target file to confirm that the target regions are likely to contain encrypted data.

According to one embodiment, the at least one processor is configured to execute the statistical analysis on the target regions based on identifying a ransomware variant that encrypts part of files. According to one embodiment, the at least one processor is configured to organize candidate attack files into classification categories based on analysis of a threshold portion of apparently encrypted files. According to one embodiment, the at least one processor is configured to organize candidate attack files into classification categories based on analysis of file signatures (e.g., common file headers and matches against original file extensions, etc.). According to one embodiment, the at least one processor is configured to organize candidate attack files into classification categories based on statistical plaintext analysis, which can include checking an entire header buffer to identify any invalid or non-printable characters or code points. According to one embodiment, the at least one processor is configured to determine that where no invalid characters are present, the analyzed file likely consists of unencrypted plaintext. According to one embodiment, the classification categories include unrecoverable files. According to one embodiment, the at least one processor is configured to identify an unrecoverable file based on a file marker check that identifies marker misplacement. According to one embodiment, the at least one processor is configured to identify an unrecoverable file based on missing metadata.

(e.g., encrypted keys or other important metadata are stored in the file by the ransomware, and must be present for the file to be decrypted).

According to one embodiment, the at least one processor is configured match characteristics of an attack to identify a threat actor. According to one embodiment, the at least one processor analyzes threat actor contact information to verify the identity of an attacker. According to one embodiment, the at least one processor is configured to generate predictive profiling features based on behavioral and forensic identifiers. According to one embodiment, the at least one processor is configured to combine a plurality of variables, and based on the plurality of variables determine attribution of an attack to a threat actor. According to one embodiment, the at least one processor is configured to forecast outcomes for a current attack based on matching attribution of the current attack.

According to one aspect, a computer implemented method for managing cyberattacks is provided. The method comprises verify, by at least one processor, integrity of ransomware encrypted files, organize, by the at least one processor, candidate attack files into classification categories, capture, by the at least one processor, a time window of incident data to enable forensic analysis, and generate, by the at least one processor, tailored visualizations, the visualizations configured to identify forensic features of interest in large volumes of data, and remediation actions associated with respective forensic features, and trigger, by the at least one processor, the system to execute a remediation action responsive to selection in the user interface.

According to one embodiment, the at least one processor is further configured to verify the integrity of ransomware encrypted files based on reverse engineered rules associated with an encrypted file format or attack vector. According to one embodiment, the at least one processor is configured to execute at least one rule to: determine a match between bytes at a specified offset and a hardcoded file marker, determine a numeric value at a specified offset falls within a specified range or set of permissible values (e.g. block size, encrypted data size, encryption mode), determine a string at a specified offset matches a regular expression or other pattern (e.g. Base64 encoded blocks of text), determine a public key at a specified offset matches an expected format, which may include mathematical verification (e.g. check that integer components of an ECC key lie on the correct curve).

According to one embodiment, the at least one processor is configured to execute statistical analysis to check entropy of one or more target regions of a target file to confirm that the target regions are likely to contain encrypted data. According to one embodiment, the at least one processor is configured to execute the statistical analysis on the target regions based on identifying a ransomware variant that encrypts part of files. According to one embodiment, the at least one processor is configured to organize candidate attack files into classification categories based on analysis of a threshold portion of apparently encrypted files. According to one embodiment, the at least one processor is configured to organize candidate attack files into classification categories based on analysis of file signatures (e.g., common file headers and matches against original file extensions, etc.).

According to one embodiment, the at least one processor is configured to organize candidate attack files into classification categories based on statistical plaintext analysis, which can include checking an entire header buffer to identify any invalid or non-printable characters or code points. According to one embodiment, the method further comprises determining that where no invalid characters are present, the analyzed file likely consists of unencrypted plaintext. According to one embodiment, the classification categories include unrecoverable files. According to one embodiment, the method comprises identifying an unrecoverable file based on a file marker check that identifies marker misplacement. According to one embodiment, comprises identifying an unrecoverable file based on missing metadata. (e.g., encrypted keys or other important metadata are stored in the file by the ransomware, and must be present for the file to be decrypted).

According to one embodiment, the method comprises matching characteristics of an attack to identify a threat actor. According to one embodiment, the method comprises analyzing threat actor contact information to verify the identity of an attacker. According to one embodiment, the method comprises generating predictive profiling features based on behavioral and forensic identifiers. According to one embodiment, the method comprises combining a plurality of variables, and based on the plurality of variables determining attribution of an attack to a threat actor. According to one embodiment, the method comprises forecasting outcomes for a current attack based on matching attribution of the current attack. According to one embodiment, the method comprises transforming raw forensic data into a directed acyclic graph ("DAG") format, optionally associating indicator of compromise with nodes on the DAG, and optionally associating nodes on the DAG with MITRE resolutions.

According to one aspect, a system for universal decryption of ransomware variants is provided. The system comprises at least one processor operatively connected to a memory, the at least one processor configured to analyze ransomed files determine at least a first ransomware variant produced at least a subset of the ransomed files, select a first decryption suite from a plurality of decryption suites based at least in part on the determined first ransomware variant, trigger decryption and validation of the subset of the ransomed files, determine at least a second ransomware variant produced at least a second subset of the ransomed files, trigger decryption and validation of the second subset of the ransomed files.

According to one embodiment, the at least one processor is configured to manage decryption on a plurality of operating platforms ("OSs"), including at least Microsoft OS, Apple OS, Linux OS, ESXi, or virtualized OS implementations. According to one embodiment, the at least one processor is configured to execute at least one of a plurality of cryptographic primitives independent of a current operating system being executed. According to one embodiment, the at least one processor is configured to decrypt files encrypted by another operating system and ransomware on a different operating platform based on execution of the at least one cryptographic primitive. (e.g., Linux version can decrypt WinOS, ESXi, etc. and vice versa).

According to one embodiment, the at least one processor is configured to access the at least one cryptographic primitive based on identifying an operating system associated with at least one of the ransomware, ransomed files, and a match to the at least one cryptographic primitive. According to one embodiment, the at least one processor is configured to enable user optimization during runtime to limit threaded decryption operations for network file access. According to one embodiment, the at least one processor is configured to display a user interface open for enabling and disabling thread limitation functionality. According to one embodiment, the at least one processor is configured to detect interfering operating system behavior that impacts decryption, and generate output logs reflecting information on failed decryption attempt. According to one embodiment, the at least one processor is configured to trigger the at least one workaround option for at least one decryption error in response to selection.

According to one embodiment, the at least one processor is configured to generate a local copy of cloud mount point (e.g., OneDrive) responsive to detection of the cloud mount point, and execute decryption on the local copy. According to one embodiment, the at least one processor is configured to order decryption operations based on a breadth-first-search on the subset of ransomed files and ransomed files of a same level of a tree structure that are enumerated before continuing down the tree structure. According to one embodiment, the at least one processor is configured to access a remote location to identify on each decryption operation any updates to variant information or changes to existing variants. According to one embodiment, the at least one processor is configured to display a common interface for a plurality of ransomware variants. According to one embodiment, the at least one processor is configured to update the common interface to access and present functionality for at least one new ransomware variant.

According to one embodiment, the at least one processor is configured to update the common interface to present updated functionality for at least one existing ransomware variant. According to one embodiment, the at least one processor is configured to execute automated unit tests to verify decryption correctness. According to one embodiment, the at least one processor is configured to execute an overwrite mode, wherein the overwrite mode includes execution to generate backups of encrypted areas of at least one ransomed file before decrypting. According to one embodiment, the at least one processor is configured to verify the encrypted areas of the at least one ransomed file for backup generation. According to one embodiment, the at least one processor is configured to generate logging and performance outcome metrics, and trigger supporting functions and features to troubleshoot decryption failures.

According to one aspect, a computer implemented method for universal decryption of ransomware variants is provided. The method comprises analyzing, by at least one processor, ransomed files, determining, by the at least one processor, at least a first ransomware variant produced at least a subset of the ransomed files, selecting, by the at least one processor, a first decryption suite from a plurality of decryption suites based at least in part on the determined first ransomware variant, triggering, by the at least one processor, decryption and validation of the subset of the ransomed files, determining, by the at least one processor, at least a second ransomware variant produced at least a second subset of the ransomed files, and triggering, by the at least one processor, decryption and validation of the second subset of the ransomed files.

According to one embodiment, the method comprises managing decryption on a plurality of operating platforms ("OSs"), including at least Microsoft OS, Apple OS, Linux OS, ESXi, or virtualized OS implementations. According to one embodiment, the method comprises executing at least one of a plurality of cryptographic primitives independent of a current operating system being executed (e.g., at a ransomware target), and optionally wherein the method comprises decrypting files encrypted by another operating system and ransomware on a different operating platform based on execution of the at least one cryptographic primitive. (e.g., Linux version can decrypt WinOS, ESXi, etc. and vice versa). According to one embodiment, the method comprises accessing the at least one cryptographic primitive based on identifying an operating system associated with at least one of the ransomware, ransomed files, and a match to the at least one cryptographic primitive.

According to one embodiment, the method comprises enabling user optimization during runtime to limit threaded decryption operations for network file access. According to one embodiment, the method comprises displaying a user interface open for enabling and disabling thread limitation functionality. According to one embodiment, the method comprises detecting interfering operating system behavior that impacts decryption, and generating output logs reflecting information on failed decryption attempt. According to one embodiment, the method comprises triggering the at least one workaround option for at least one decryption error in response to selection. According to one embodiment, the method comprises, generating a local copy of cloud mount point (e.g., OneDrive) responsive to detection of the cloud mount point. and executing decryption on the local copy. According to one embodiment, the method comprises ordering decryption operations based on a breadth-first-search on the subset of ransomed files and ransomed files of a same level of a tree structure that are enumerated before continuing down the tree structure.

According to one embodiment, the method comprises accessing a remote location to identify on each decryption operation any updates to variant information or changes to existing variants. According to one embodiment, the method comprises displaying a common interface for a plurality of ransomware variants. According to one embodiment, the method comprises updating the common interface to access and present functionality for at least one new ransomware variant. According to one embodiment, the method comprises updating the common interface to present updated functionality for at least one existing ransomware variant. According to one embodiment, the method comprises executing automated unit tests to verify decryption correctness. According to one embodiment, the method comprises executing an overwrite mode, wherein the overwrite mode includes execution to generate backups of encrypted areas of at least one ransomed file before decrypting. According to one embodiment, the method comprises verifying the encrypted areas of the at least one ransomed file for backup generation. According to one embodiment, the method comprises generating logging and performance outcome metrics, and triggering supporting functions and features to troubleshoot decryption failures.

According to one aspect, a system for managing cyber-attacks is provided. The system comprises at least one processor operatively connected to a memory, the at least one processor configured to instantiate a web based application, the web based application configured to integrate with a set of threat actor tools and/or output data from the set of threat actor tools, accessing the set of threat actor tools via secure communication or a plurality of application programming interfaces (APIs) tailored to respective ones of the threat actor tools the secure communication or respective APIs configured to identify regular expressions, patterns, or emulated behaviors within data of a respective threat actor tool, match activity to indicators of compromise (IOC), and capture data from the respective threat actor tools associated with the IOC, and construct parameters for decrypting ransomed files and generate a first file for storing and accessing associated decryption key information, and a second file for storing and accessing ransomware variant(s) specific parameters for executing decryption.

According to one embodiment, the at least one processor is configured to leverage the data produced by threat actor tools, and encode the data produced by the threat actor tools as nodes in a directed acyclic graph. According to one embodiment, the at least one processor is configured to extract encryption key material from a plurality of threat actor tools, and store encryption key material with an association with an IOC or MITRE resolution. According to one embodiment, the at least one processor is configured to maintain a library of knowledge including identified solutions or remediations and association with respective malware, respective attack, respective ransomware, and/or respective threat actor profiles. According to one embodiment, the at least one processor is configured to generate a json and dat format file output to enable confirmation of a presence of extracted keys. According to one embodiment, the at least one processor is configured to capture a memory dump created via execution of a threat actor tool, wherein the at least one processor is configured to manage execution of the threat actor tool within a controlled environment (e.g., secured) or through an emulation process in which the threat actor tools is executed.

According to one embodiment, the controlled environment (e.g., secured) or the emulation process in which the threat actor tools is executed enables capture of execution information in the environment or process (including e.g., stack trace, memory dump, execution thread, etc.). According to one embodiment, the at least one processor is configured to execute subroutines configured to emulate or replicate parsing behavior for a target threat actor tool that the threat actor executes to locate and extract any embedded decryption parameters. According to one embodiment, the at least one processor is configured to enable configuration merging across multiple encryption variants based on providing multiple decryption keys associated with multiple independent ransomware variants in the merged configuration. According to one embodiment, the at least one processor is configured to manage single triage configuration (e.g., .dat files) configured to validate the encryption integrity of encrypted files across a plurality of ransomware variants and/or operating system environments.

According to one aspect, a computer implemented method for managing cyberattacks is provided. The method comprises instantiating, by at least one processor, a web based application, the web based application, integrating, by the at least one processor, a set of threat actor tools and/or output data from the set of threat actor tools, accessing, by the at least one processor, the set of threat actor tools and/or the output data via secure communication or a plurality of application programming interfaces (APIs) tailored to respective ones of the threat actor tools, identifying, by the at least one processor, regular expressions, patterns, and/or emulated behaviors within output data of a respective threat actor tool, matching, by the at least one processor, activity to indicators of compromise (IOC), and capturing data from the respective threat actor tools associated with the IOC, and constructing, by the at least one processor, parameters for decrypting ransomed files and generating a first file for storing and accessing associated decryption key information, and a second file for storing and accessing ransomware variant(s) specific parameters for executing decryption.

According to one embodiment, the method comprises leveraging, by the at least one processor, the data produced by threat actor tools, and encoding, by the at least one processor, the data produced by the threat actor tools as nodes in a directed acyclic graph. According to one embodiment, the method comprises extracting, by the at least one processor, encryption key material from a plurality of threat actor tools, and storing, by the at least one processor, encryption key material with an association with an IOC or MITRE resolution. According to one embodiment, the method comprises maintaining a library of knowledge including identified solutions or remediations and association with respective malware, respective attack, respective ransomware, and/or respective threat actor profiles. According to one embodiment, the method comprises generating a json and dat format file output to enable confirmation of a presence of extracted keys.

According to one embodiment, the method comprises capturing a memory dump created via execution of a threat actor tool, and managing execution of the threat actor tool within a controlled environment (e.g., secured) or through an emulation process in which the threat actor tools is executed. According to one embodiment, the method comprises capturing of execution information in the environment or process (including e.g., stack trace, memory dump, execution thread, etc.) via the controlled environment (e.g., secured) or the emulation process in which the threat actor tools is executed. According to one embodiment, the method comprises executing subroutines configured to emulate or replicate parsing behavior for a target threat actor tool that the threat actor executes to locate and extracting any embedded decryption parameters. According to one embodiment, the method comprises enabling configuration merging across multiple encryption variants based on providing multiple decryption keys associated with multiple independent ransomware variants in the merged configuration. According to one embodiment, the method comprises managing single triage configuration files (e.g., .dat files) configured to validate the encryption integrity of encrypted files across a plurality of ransomware variants and/or operating system environments.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 1 is an example screen capture, according to one embodiment;

FIG. 2 is an example screen capture, according to one embodiment;

FIG. 8 is a block diagram of an example flow and system elements, according to one embodiment;

FIG. 11 is an example analysis and interface display, according to one embodiment.

DETAILED DESCRIPTION

Figure 3:
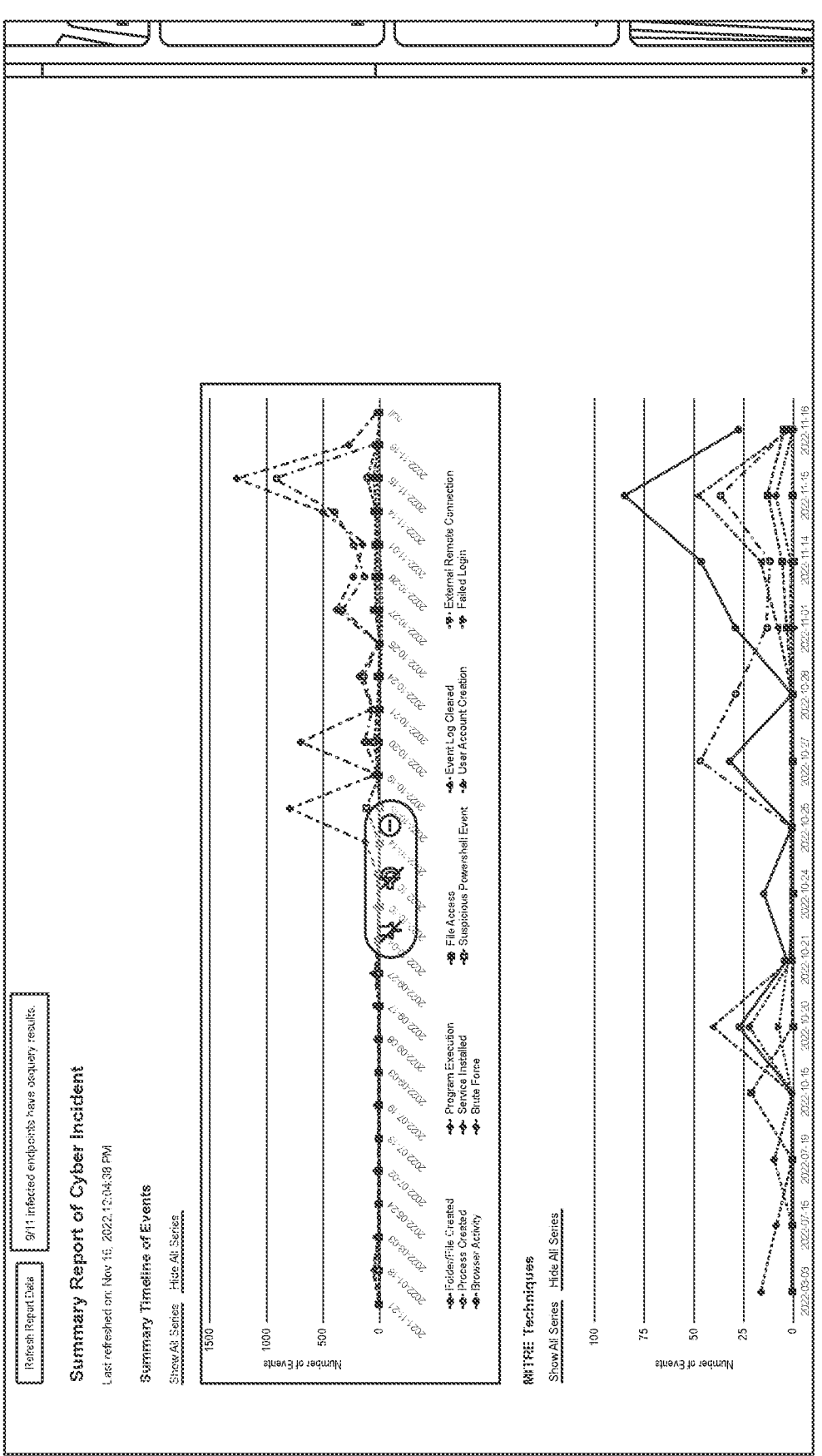
FIG. 3 is an example screen capture, according to one embodiment.

According to various embodiments, systems and methods are provided for resolving ransomware attacks. The system can include multiple components that perform aspects of the capture, analysis, visualization, and remediations of such attacks. According to one embodiment, the system can include a capture and analysis component that is configured to capture high volumes of forensic data for a time window preceding, during, and after an attack. The capture and analysis component can leverage cloud compute resources to analyze, filter, and group information based on developing the data needed to analyze a plurality of attack variants. The system can execute variant specific queries to filter and transform captured data into relevant incident groupings. Further, the system can build timeline visualizations that allow users to interact with and understand the massive amounts of underlying forensic data. Some example implementations of the capture and analysis component include the Recon software/platform and/or Mdetect functionality.

In other embodiments, the system can include remediation functionality to reverse attacks or decrypt ransomed files. In some embodiments, the remediation functionality analyzes ransomed files to determine if remediation or capitulation is even possible. The analysis facilitates successful recovery of ransomed files with functionality unavailable in conventional approaches. Some implementation examples of the remediation components and/or functionality include the Unidecrypt software and algorithms. Example implementation examples of Unidecrypt are described herein. According to some embodiments, scalable deliverability of Unidecrypt software is enabled through the use of Abisko, an automated system that is configured to extract key material from connections to a plurality of threat actor tools. For example, the Abisko system is configured to leverage the data produced by threat actor tools and make it usable across the variety of threat actor tools under a consistent and managed reimplementation. In further embodiments, any solution or remediation identified can be incorporated into a library of knowledge on respective malware, attacks, ransomware, and/or threat actor profiles. The library can then be leverage in different context and leveraged in completely different computing environments. According to one embodiment, the Unidecrypt software and functionality can utilize the captured data, as well as transformations, and modification of the captured data to provide a consistent and more efficient system for responding to cyberattacks, for example, by making solution implementation universal across operating systems.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

According to some embodiments, a monitor and capture tool executed by the system can include OSQuery. OSQuery captures a host of activity on a single host or groups of computers. The captured results can be pushed or pulled to analysis servers/components. In various examples, the captured data is encrypted and secured before any communication. In some examples, the monitor tool can be deployed via Group Policy, scheduled task, or deployed through available recovery software (e.g., SCCM, an EDR solution, etc.). The monitor is configured to capture activity on a target domain or specific endpoints. In some embodiments, the system is configured to connect to an S3 bucket to manage the volume of captured data, the S3 bucket can be configured to decrypt the received data and then perform analysis. In further examples, the system can present user interface options for selecting data to upload, and request confirmation prior to any transmission.

The system can be configured to immediately respond to receiving captured data and execute processing on the back end. In some embodiments, the system processes the attack data using predefined queries which can be orchestrated through Apache Airflow. In one example, the queries are executed via Athena queries to parse the raw forensic data, identify interesting/suspect events, and generate a standard format output. The standard format output can be used to generate visualization of the data of interest, and enable users to access and use the analysis in identifying vulnerability, resolving attacks, etc. Various embodiments are configured to translate raw forensic data into directed acyclic graphs ("DAG"). These data structures provide improved storage and access to forensic data over conventional approaches. Various embodiments are configured to leverage the DAG format to process results more efficiently and provide improved storage over many know approaches. According to some examples, the DAGs capture information on an observed event and integrate the pieces of information that are the most interesting for a forensic investigator.

In one example. one of the more complicated DAGs is generated by combining multiple fields from the "service installed" query. According to some embodiments, the system is configured to identify specific event types in raw forensic data and transform that data into DAG based on various events that can include; program execution prefetch, file access, program execution, lnk file access, scheduled tasks, log errors, log file creation/deletion. All of these events are summarized in a single, human-readable, searchable field by the system, which is optimized in various embodiment by encoding specific data nodes in respective DAGs, where the nodes and included information are based on identified events.

In further embodiments, the service installed query is executed by the system to concatenate service name and execution/file path to create a readable and queryable event activity summary. In further example, the query can be constructed and executed to concatenate sha256, sha1 and md5 file hashes as separate queryable fields. According to one embodiment, the query is constructed and executed to join the above fields against a library or table of indicators of compromise ("IOCs") to enrich the results with any one or more matching MITRE techniques and/or malicious indicators associated with known threat actor behavior (including sanctioned threat actors). Further embodiments generate and execute further queries where raw data fields are concatenated into queryable event activity summaries, and those data objects can be further enriched with IOC and MITRE techniques.

According to some embodiments, the system is configured to generate a portal and user interfaces for accessing the analyzed forensic data. For example, the standard format data can be ingested by the portal and visualized in the interfaces. FIG. 1 shows an example screen capture of a user interface. The user interface provides links to the endpoints analyzed and organizes forensic events found for respective devices. Executed queries can be linked to specific events and the responsive information display in associated with those specific events. The log and manifest options transition the UI to visualization of the monitor log specific to each device (e.g., records any errors and commands run on the command line) and associated manifest accordingly.

According to one embodiment, the system can include a plurality of components configured to perform respective tasks and/or functions. In some examples, the system can include a recovery engine configured to instantiate the respective component or execute the respective functionality without the need for individual components. The system can likewise execute the disclosed functions or operations generally without need for components or engines.

Figure 8:
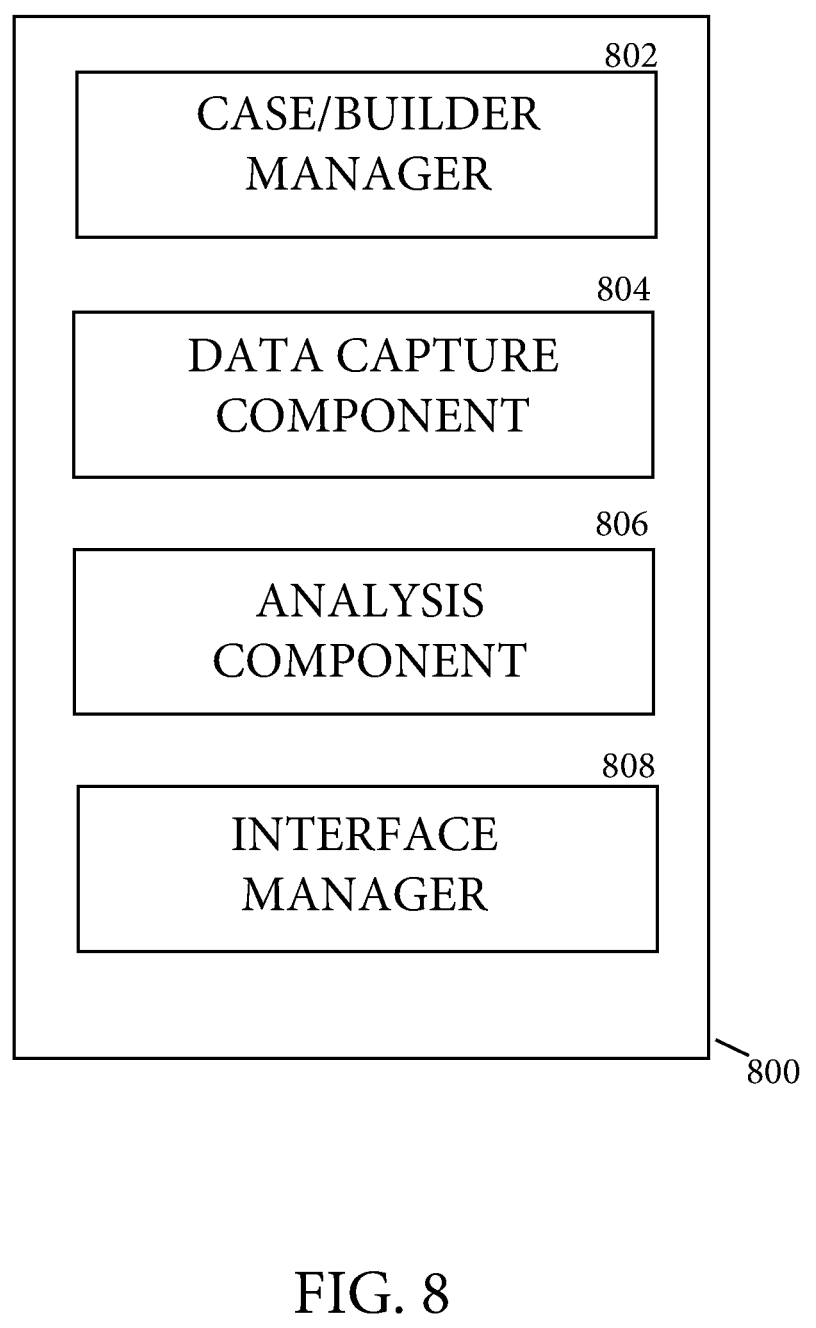

In some embodiments, the system is configured to generate case numbers for each event/analysis and ensure consistency between binary file naming and the case number. In various embodiments, the system 800 of FIG. 8 can includes a case/build manager component 802. The case component 802 can be configured to assign case numbers, implement build/case security, and ensure case/build identifying information is include with any raw or processed data. For example, the system can use the uploaded data to determine the case number assigned and/or embedded in the binary formatted information. The case number provides a means for organizing the data and analysis. The output for the endpoints indicates the operating system, how many forensic events were found, how many project files are included, which files failed verification checks, etc. Raw data can be collected by distributing monitor/capture functions or software from a data capture component 804 to client endpoints or by having client systems/users request installation or authorize distribution (e.g., from capture component 804, among other options).

The system can be configured to link the log from the command prompt on the portal as well as the server to any identified errors for access, or other specific forensics events. Such linkage in the displays on the user interface enable end user to select and drill into any event and/or drill into information for specific end-points, among other options The ability to drill into end-point specific information can be used in conjunction with other selection functions, including further specifying specific events in a displayed timeline for a selected end-point. In various embodiments, an interface manager component 808 can be configured to execute display functionality, build timeline displays, and provide for visual navigation or query execution on the display data, among other options.

According to various embodiments, the captured data is analyzed to determine a ransomware variant (e.g., a specific attack modality). For example, an analysis component 806 can be configured to process collected date (including, for example, raw event data) to identify events associated with an attack. In the screen capture, the system has identified the ".meow" extension as a member of a certain variant of ransomware. The system provides a visualization of how many files and the size of those files that are actually encrypted. For example, various attack modalities may transform a host of files into a new extension format. Generally, if the transformation involves encryption, the associated decryption key will be needed to resolve. However, simple renaming operations can conceal plaintext files that can be easily restored, and in addition some encryption operations fail, in essence corrupting a file beyond recovery.

Shown in the UI is information on verification failures, and if the user selects this information, the indication reflects that this file, or the three example files shown are not actually encrypted. The analysis in this example, has determined that if the system removes the .meow extension from these files they would open. This analysis and UI feature provides functionality unavailable in various conventional systems, and improves efficiency of computer systems over known approaches. More specifically, identifying holistically and consistently executing recovery operations on files (e.g., by testing specific transformations (assuming plaintext), the system reduces the compute resource required on more difficult recovery operations, and potentially even eliminates the need for further analysis on large portions of ransomed files. Especially in the beginning of a case analysis, the system identifies what is potentially not encrypted. As discussed, by identifying files that are not encrypted, the system limits expensive/computationally burdensome decryption operations and improves on various approaches.

Further the system determines and displays any files where the failed verification indicates that the underlying files are unrecoverable (even by the threat actor). As most ransomware is not robust, or quality controlled like commercial software, errors that occur in generating encrypted files can result in complete loss of data even if the ransom is paid. Various embodiments of the system identify such corruption, improving the efficiency of the system by limiting decryption activities to files that can be recovered, and further prevents ransom targets from paying for files that cannot be recovered or spending further system resource time on corrupt data. In various examples, the analysis component is configured to analyze the captured data and test potential remediation (e.g., identify from similarity or matching data in the library) as well as validate the raw captured data as potentially recoverable, hidden plain text, and even identify unrecoverable data.

Based on the criticality of the unrecoverable files, the ransom target may be able to cease all activity or interaction with the threat actor. In various embodiments, the system's analysis determines that it is likely that not only would the system's decryption operation fail, but based on the file integrity check that even if the ransom was paid, the threat actor would fail in decryption as well. For example, the system can identify integrity failures that result from writing an encrypted key to a footer in the file along with some other metadata, and identifying circumstances or patterns that result when the attack software crashed or something else went wrong. The system is configured to analyze and detect when the attack software failed to correctly generate the file. For example, by matching corrupted properties to current file properties and/or metadata (e.g., files size). In such cases, decrypting the file for recovery becomes impossible even for the attacker.

According to some embodiments, the verification failures signal cases where the system has identified resolutions, solutions, or exploits for identified attack vectors. In some examples, the system identifies a malware/ransomware variant and captures any known resolutions, solutions, or exploits as options to decrypt or recover original files. As discussed above, the system can match ransomware properties to library information associated with similar or matching attacks (even where different computing platforms are at issue (e.g., different operating systems, etc.). In some examples, the system identifies a variant or potential exploit by scanning the file and includes that identification/option in the user interface. The options can include remediation functions/operations identified (e.g., from the library), for example, based on the variant identification. In some examples, a validation failure shown in the UI means that the threat actor failed to encrypt the file properly. In further example, this may mean that the file is not unsalvageable and enables the system to salvage the file without an encryption key. The system is configured to test potential resolutions against the identified files and provide information on success or need for further remediation.

As discussed, the system is configured to identify not only verification failures, but also the files that are unencrypted. For example, in some cases the system can rename a file without the attack vector extension and that renaming enables access to the original file (e.g., open a Word document), whatever extension the source files are. In some examples, the system includes signatures for file types and common features that can be matched to ransomed files to identify an extension to use. In some embodiments, the system executes similarity analysis against prior ransomed files that were not encrypted and upon determining a threshold similarity, uses prior resolution information to guide recovery. In still other embodiments, the system can use common extensions on failed verification files to attempt to restore access. In some examples, the system can iteratively test resulting files under the various extension and formats to determine validity/recoverability of an output.

As discussed, the system is configured to generate analysis that is unique, based upon the ransomware variant(s), and also the case number. In further embodiments, the system enables changes to configuration files, adjustments to how the system is performing verification checks, and providing the client with another build for each set of circumstances, so that the builds are tailored and specific to the circumstances and context of that case. In some embodiments, the system generates multiple builds per case, in order to make sure that the data collected is as accurate as possible, as well as reflective of potential remediation options. Security features can also be tailored to respective cases, so that the system even when recovering files can ensure that the resulting recovered file does not represent or include a new attack vector (e.g., embedded backdoor, additional malware, etc.).

Example Functionality Collection & Analysis

According to some embodiments, the system is configured to manage a variety of detection and information collection services to facilitate attack remediation/resolution. According to further embodiments, the tools and/or functions for collection and analysis of relevant information can be bundled into the Recon/Mdetect suites. Although in other embodiments, the described functionality can be implemented separately and in different combinations of the described functions. In some embodiments, the collection and analysis tools are configured to capture and develop information to verify the integrity of ransomware encrypted files. In some examples, verification can be rule based. In various instances, rule based verification is enabled through reverse engineering of the encrypted file format produced by a specific malware sample. Examples of rules include determining if:

bytes at a specified offset match a hardcoded file marker a numeric value at a specified offset falls within a specified range or set of permissible values (e.g. block size, encrypted data size, encryption mode)

can include determining if a string at a specified offset matches a regular expression or other pattern (e.g. Base64 encoded blocks of text, among other options).

a public key at a specified offset matches an expected format and, if possible, be verified mathematically (e.g. check that integer components of an ECC key lie on the correct curve)

matching patterns exists: in some instances patterns can be identified in encrypted files using cryptanalysis to facilitate resolution attacks matching statistical analysis exists: some ransomware variants only encrypt part of the file and/or require encrypted keys to be present in order for decryption to succeed. In these cases, the system can check the entropy of specific regions of the file to confirm that they likely contain encrypted data.

In some embodiment, an analysis component (e.g., 806) is configured to execute any one or more or any combination of the disclosed rules to evaluate ransomware data. According to some embodiments, the collection and analysis can include functionality to organize affected files. The files can be organized into classification categories to facilitate analysis and/or resolutions. For example, the system can identify unencrypted files. In one example, the system is configured to read the first few hundred bytes of each apparently encrypted file for verification. Other limits can be used verify one kilobyte or more of each file, however various embodiments enforce size limits on the verification to maintain fast scan times.

Other examples include categorization based on signature analysis. For example, the system can be configured to look for common file headers and match them against original file extensions (e.g., .jpg or .docx). In further embodiments, this feature can be disabled. The system can be configured to recommend disabling this feature in the event that a specific strain of malware leaves headers unencrypted. Again, the system can be limited to analysis of the first few hundred bytes (or other threshold) of a file to maintain fast scan times. In further examples, files may also be categorized based on statistical plaintext analysis—where the system is configured to check the entire header buffer to see whether there are any invalid or non-printable characters or code points. The system is able to leverage a determination that no invalid characters are present, which indicates that the file likely consists of unencrypted plaintext.

According to still other embodiments, the system is configured to categorize unrecoverable files. For example, some encrypted files may be partially or completely unrecoverable, even with the correct decryption key, as the result of missing metadata or corrupted file contents. In another example, some strains of malware have bugs such as incorrect file pointer math that cause them to overwrite sections of encrypted data resulting in corruption. The method of detection can vary, but one example includes checking for a file marker misplaced somewhere in the middle of the file instead of the very end. Another example includes detecting missing metadata. In some instances encrypted keys or other important metadata are stored in the file by the ransomware, and must be present for the file to be decrypted. The system executes a variety of analytics and/or techniques (e.g., outlined above) to detect when these are missing, so the system can generate a report of damaged files.

Other categorizations/classifications include:
ransomware encrypted
    Identify ransomware variant based on extension analysis, signature analysis, etc. The total number of encrypted files and the total size of the encrypted data is tallied.
Attack variant class
    Identify by extension or rename convention.
        When possible, files can be identified by a unique naming convention, specified by an encrypted file extension or regular expression.
    Identify by signature of output file
        In cases where the encrypted file extension is an unreliable indicator of encrypted files, the system relies on the contents of the file (e.g. file markers or other metadata in the footers) to verify that a file was encrypted by a specific variant.
    Verify the Threat Actor ("TA")
        Ransom notes are collected for many variants, which often include TA contact information that can help verify the identity of the attackers, even if they are using the same malware as other groups.
Threat actor identification enables the system to leverage all prior experience with the same threat actor and even leverage patterns in the threat actors approach (e.g., multi-level encryption, hiding plaintext files with different extensions, to identify a few examples).

According to various embodiments, regardless of the threat actor or ransomware variant, a host can have its operating system data scanned for specific forensic artifacts using, for example, various scan tools. OSQuery is an example scan tool that is preconfigured with query "packs" to traverse an operating system and parse relevant forensic artifacts. Almost all forensic artifacts have a timestamp to reference the first or last time an action occurred. Once the artifacts are parsed, the data is encrypted locally on the endpoint and then uploaded for backend processing. Athena queries can be run against the full dataset uploaded, which outputs to an index on Splunk, which can be used to generate a timeline of events to display on the frontend portal. In some examples, the system can be configured to verify the data collection by a given scan tool. In one example, the system checks for the existence of logs, registry data, etc. and records their respective sizes so that the system can confirm data is not missing.

According to other examples, the system can monitor data collection for size issues (e.g., host storage limitations). In some instances, the system can develop partial results. However, unlike the Mdetect results, OSQuery results can be streamed to the encrypted output file one row at a time, as soon as each query returns results, so the system can recover whatever results have been written if even a crash occurs before all of the queries have run. In other examples, the system can evaluate the main/stdout/stderr logs to identify and notify of incomplete results have been generated due to early exit, among other options.

Various scan tools can be limited to only look for certain data/parameters. For example, the OSQuery pack for Windows Event Logs is only going to look at pre-specified event logs (Security.evtx, System.evtx, etc.) and then within those logs, only look for certain Event IDs. By not parsing every single Event Log and Event ID, system embodiments generate results more efficiently and with a more focused scope. Traditional forensics would collect all event logs and all event IDs, but then require an analyst to filter down the result set to look for events that would show evidence of failed logins, external remote logins, new account creations, services being installed, etc. OSQuery packs are configured to parse the events that an analyst would already need to look at, eliminating the need to collect and sort out events that are less helpful or irrelevant thereby improving operation over conventional implementation. Another example is based on the hashing of files. In some embodiments, the system executes modified OSQuery packs that are configured to limit hashing of files to those in certain directories with certain file extensions. Various embodiments leverage targeted hashing of files avoiding conventional and cumbersome approaches that hash all files on a system which results in massive computational waste. For example, many files are normal operating system data. The system is configured to limit the need to review mass datasets and instead is targeted to areas of a disk that a threat actor or malware are likely to impact.

Most traditional forensics rely on the use of Excel spreadsheets to sort/filter the data. There are some industry tools that will process forensic data and present it in an Excel format (columns/rows/filters), but none display the data as a visualization first or in a way that is easier to understand. Various embodiments filter the data being viewed and target selection of data displayed to enable the user/system to act and provide functions that are configured to take remedial actions. In conventional systems using Excel or similar tools, the users are required to know some information about an attack (i.e. date it happened, identify compromised user accounts, identify suspected point of entry a-priori), otherwise the user is left to look and sort through massive volumes of data for anything that appears "bad." Once identified the user then has to work backwards. In various embodiments of the current system and UI, the data is presented as a line graph to show not only baseline events, but dates where there is an uptick in activity, which the system identifies as consistent with the date of an attack/indicative of an attack. In various settings, an analyst can view the UI without having any information on the underlying attack (unlike conventional systems) and based on the system analysis know the potential date of attack, and view the system identified attack techniques or attack tools a threat actor was using. While in the time context, the user interface is configured to enable zoom in/filter down into the specific events to gather more detailed information from the timeline. In a traditional analysis, the detailed information would first need to be reviewed and understood to then make any inferences about an attack. The system identified activity and timeline improves over such approaches and reduces conventional analysis techniques that require pre-knowledge and that takes several hours, if not days, into operations to traverse the tailored UI screens.

The system can include and update a library of indicators of compromise ("IOCs") that can be defined based on a variety of sources (e.g., firsthand collection via Recon, forensic partners, government/LE agencies, public threat intelligence sources, among other options). Each IOC within the library can be linked to a MITRE ATT&CK ID, which allows the system to provide information for analysts to immediately understand what a file or threat actor action is in the various displays. In further embodiments, the analyst can review the detailed timeline data, and can identify any false positives or for new tactics/techniques that could be added to the IOC library. In some embodiments, the system is configured to update the library of IOC based on subsequent analyst review.

In still other embodiments, the system is configured to generate and display predictive profiling features based on behavioral and forensic identifiers. In one example, the predictive profiling features are generated by the system by combining different variables to determine attribution of attacks to a threat actor. The system can then predict potential outcomes for specific remediation actions and present those to an analyst in the UI. In one example, the system is configured to use attribution to aggregate and analyze outcomes of prior attacks to forecast outcomes for current attacks. In another example, the system can provide predictions on a success rate associated with paying a ransom for recovering subject data.

Shown in FIG. 2 is a screen capture listing ransom file properties having .meow extension and with no variation in the file encryption. In other examples, there are a lot of variants that vary encryption keys per drive, per host, or combinations thereof on a single host. For example, if a host has ten mapped drives, it is likely that there will be ten identifiers for that analysis, if not more. The system is configured to capture and analyze each of those cases. Having the system link such identifiers into an overarching case and mediation plan, eliminates many human errors in resolution. For example, if a user pays the ransom but mistakenly misses a key account (e.g., one of the multiple IDs). Such human errors occur frequently when using conventional remediation approaches. In various embodiments, the system generates and manages a comprehensive list of attack identifiers. The system can even track and verify that negotiated resolutions with threat actors cover the entirety of the attack identifiers, eliminating potential for human error. Thus, the system identification, management, and handling of respective attack identifiers materially reduces the resources required to resolve attack scenarios.

As discussed above, the identification of verification failures provides significant benefit over known approaches that identify options for resolution without a decryption key or the threat actor. For example, the system can collect enough information about the encrypted files to actually skirt some otherwise required operation. The system can use a scan identifier to reflect the whole of an attack and confirm the scope of recoverable encrypted information. The system can even create, recreate, and then modify a scan identifier to track the deliverables requested and received during interactions with a threat actor.

According to some embodiments, the system provides OSQuery to enable capture of attack data to support forensic triage analysis. Once forensic data is captured the system executes Athena-based queries to parse the data into logical and relevant data sets. Generated files reflect a set of forensic events and at a level of detail that facilitates remediation. For example, the system constructs a timeline of events, across different event categories that the system identified. The system is configured to identify events that are typically important indicators of threats, or attacks. In some embodiments, the system is configured to display such timelines and include a MITRE attack framework display of the same. As there are different IDs associated with the different software or the different techniques various attackers use, the system is configured to emphasize different events, and/or tailor displayed events to specific attack variants. In one example, if an attacker deletes data, or exfiltrates data, or executes ransomware, the system associates different IDs to those attacks and tailors the displayed information (and for example Athena queries) to those specific IDs.

In various embodiments, the system includes a library of indicators of compromise, that the system links to the IDs, with certain activity that have been recorded, or the known authorities have identified. The system can then map indicators found during its scan back to that ID, which is used to build a holistic and target view of the incident. FIG. 3 is a screen capture of such a visualization. As shown, the system enables the ability to rapidly perform forensic analysis and focus on data points that are known to be malicious. Importantly, the timeline visualization provides the user with a sense of when a threat actor was potentially on the network, and what actions were taken at that time. Further the system enables users to select and focus on specific events and times to limit the analysis or analyze those same events across multitudes of end-points.

Once the timeline is constructed and focused, the system enables generation of triage reports, which encompass the visualization but in a shareable document form. The triage report can include a mitigation summary of actions. In some embodiments, the system can include automatic triggers that allow users to execute any of the recommendations on their system. Further, the recommendations and links to actions that require containment as well as on hardening respective systems against future attacks to provide containment provide significant advance in this field.

According to one embodiment, the system is configured to provide timeline displays that extend over a period of ninety days to ensure forensic triage capability. At the ninety day level of review the focus is not necessarily prevention, but also includes streamlining the observable events for visualization that occur over the previous three months, and that led to a visualized attack. Conventional approaches provide no ability to access or manage this level of information. In one example, excel spreadsheets are used to capture and manage forensic data. Any user would be overwhelmed at the volume and be unable to make use of the information provided. To provide perspective, the captured data typically spans, gigabytes, there is no known way to enable users to consume or review this volume of data under current approaches.

Figure 4:
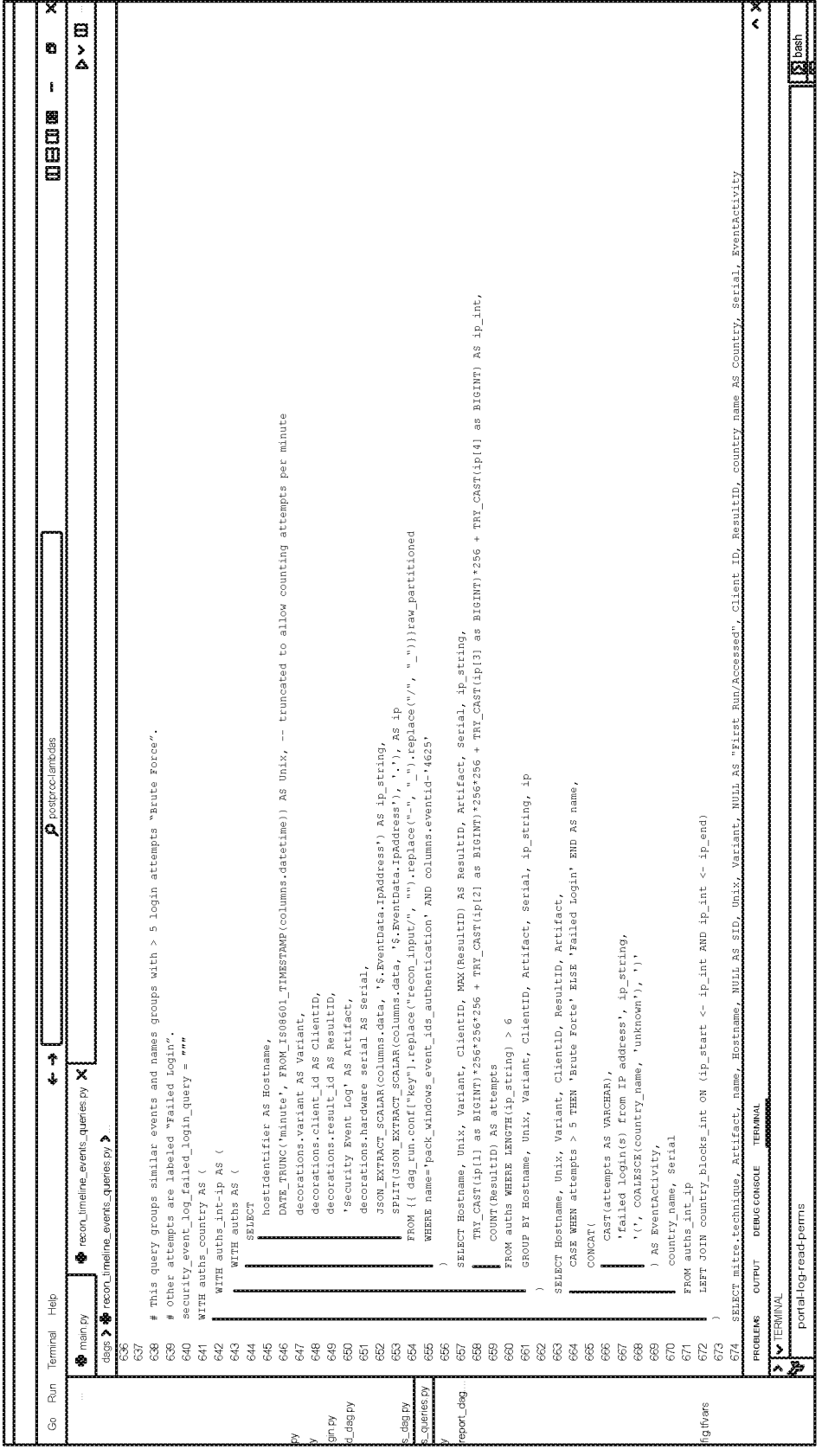
FIG. 4 is an example screen capture, according to one embodiment.

Shown in FIG. 4 is an example query that the system uses to parse and filter data to relevant and interesting incidents. The system leverages a plurality of queries that filter and target forensic incidents of interest. Once the system focuses the data set the respective incidents can be shown on the timeline display. The example query is executed to filter on specific types of forensic data captured by the monitor processes (e.g., OSQuery). The system identifies interesting pieces of information, but also errs on the side of collecting raw data as much as possible. This implementation enables the system to provide more flexibility as the system queries can change, be refocused, etc., without requiring changes to data collection operation. This can also be helpful in reprocessing older cases, leveraging new information on older cases, and providing a consistent data set.

In some examples, the system is tailored to eliminate identified false positives over time, improving system efficiency and even identifying vulnerabilities missed in older cases. In the query example, the system is targeting specific login events (e.g., from OSQuery) that have specific event IDs in the Windows Event Log. The system then applies the scripted logic on top of those filters, to add Geo-based intelligence, IP location, number of login counts, and a period of time. The query enables the system to group and transform a massive data set (e.g., from OSQuery events), and outputs, for example, a seventeen failed login attempts from a target IP (e.g., in Poland). Often a large number of queries (e.g., 10, 15, 20, . . . ) can be used to group and transform forensic data into usable visualizations reflected on a timeline.

In further embodiments, the system enables dynamic interaction with the visualizations shown. For example, each user can emphasize a desired characteristic (e.g., a spike of potentially malicious events, certain posts, or events of a certain type, or a certain MITRE technique, among other options). In various embodiments, the system presents a default set of visualizations—Summary timeline of events, MITRE Techniques over time, and a Timeline by Host visualization. Each user is then given the ability to interact with the various visualizations in any order and at any desired level of granularity. Selections in the UI can be leveraged by the system to refine Athena queries and/or filter the various displays.

Figure 5:
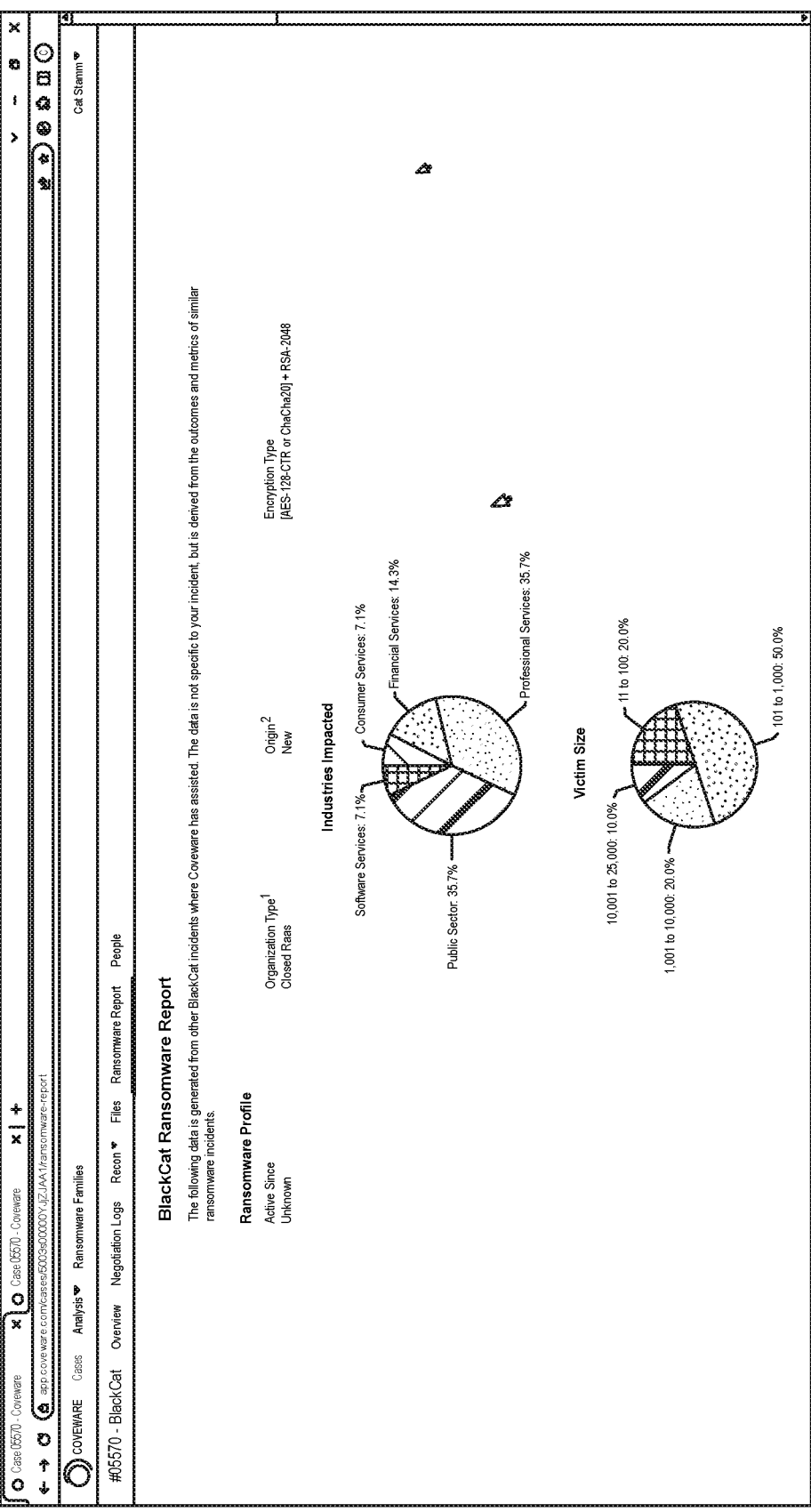
FIG. 5 is an example screen capture, according to one embodiment.

In other embodiments, the system links forensic analysis to actionable information displays. For example, the system maintains records on ransomware attacks and resolution (even payments to threat actors). For example, the system can present a ransomware profile match to an analyzed attack, tailored to any of an organization type, industries impacted, victim size, etc. The user can transition between these selections in the UI. Shown in FIG. 5 as an example, the first fold of this display page reflects the result of historical and/or data entry information, which is linked by the system to the current state of review. In some examples, the system enables users to enter their historic data on threat actors or variants, and leverage that data in the visualizations of potential remediation. In some embodiments, the system can also provide an efficiency analysis of resources required to remediate an attack (e.g., attempt to recover data) against a known threat actors ransom value and likelihood of positive outcome for an identified threat actor.

Figure 9:
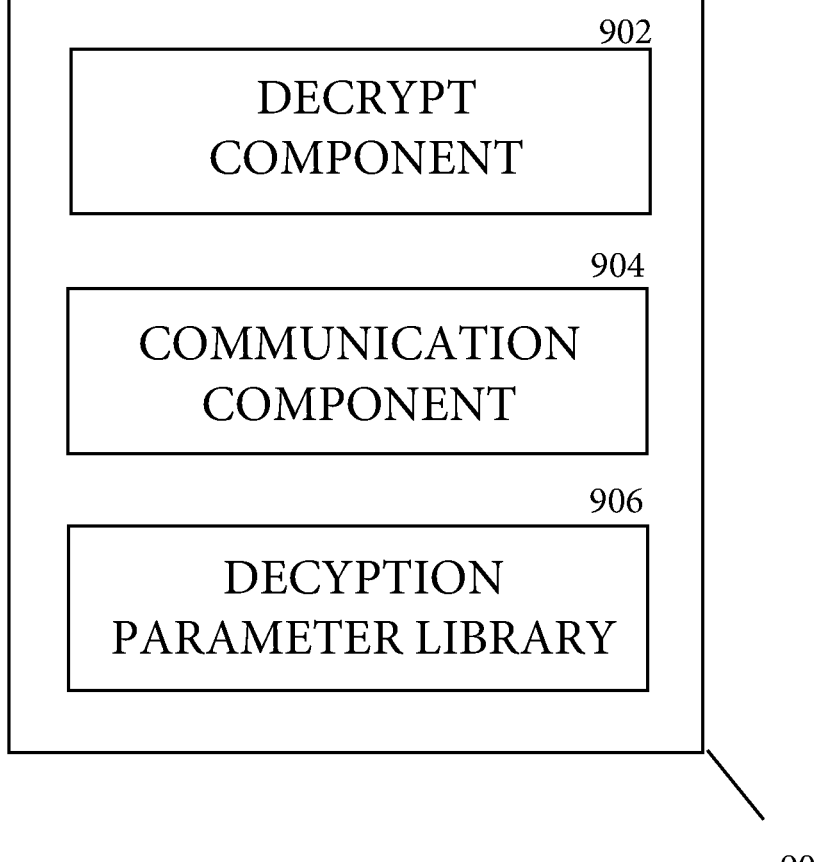
FIG. 9 is a block diagram of an example flow and system elements, according to one embodiment.

In further embodiments, the system provides tools for reversing attacks on data. In one embodiment, the system provides a Unidecrypt tool for universal decryption of ransomed files. The Unidecrypt tool can be plugin based, and various ransomware variants can be addressed by activating respective plug-ins. In further examples, .dat files specify variant specific information that can be used to decrypt or access ransomed files, based on respective variants. According to some embodiments, a decryption subsystem 900 of FIG. 9 can be configured to provide decryption functionality. The subsystem 900 can include a plurality of components and/or decryption engine. In other embodiments, the subsystem 900 can execute any decryption functionality generally, with or without the components and/or engine. According to one embodiment, end user can access the subsystem and a decrypt component 902 can be configured to provide access to plugins that perform decryption function and/or execute such functionality as a web interface, among other options. According to one embodiment, a collection of decryption functions can be referred to a decryption suite, and each option within a suite can be associated with context information for selecting when to use a respective decryption function. The context can be encoded as metadata, and can be used to match specific ransomware variants, ransomware extensions, pattern of attack behavior, patterns within forensic data, resulting state in ransomed computers, patterns in ransom requests or options to pay for solutions, among other options.

According to various embodiments, Unidecrypt can work in conjunction with various web services to enable remediation. For example, "Abisko" is a web based application that leverages functionality and/or parses data from threat actor tools along with some optional input in order to create both a json and dat output. In some embodiments, the json output can be used for visual confirmation of the extracted keys, and can also be used as input when adding additional extracted key information for a single .dat file. According to some embodiments. the .dat output is used in conjunction with the Unidecrypt build described herein. The .dat output is constructed to contain ransomware variant specific parameters required to facilitate decryption.

In some embodiments, the subsystem 900 can include a communication component 904 configured to manage interaction with external threat actor tools and/or internal threat actor functionality. The communication component can be configured to leverage application programming interfaces ("APIs) to interact with external tools, and specific APIs can be called/select, and for example, with customized information according to an identified ransomware context.

In further embodiments, the Abisko tool or functionality processes threat actor tools in multiple ways. For example, parameters used for decryption, like for example decryption keys and file extensions, can be extracted through:

Pattern matching, for example using regular expressions, directly on the threat actor decryption tool Pattern matching, for example using regular expressions, on a memory dump created either manually via execution within a controlled environment or through emulation Subroutines, for example, executing subroutines capable of emulating or replicating the parsing behavior the threat actor tool itself uses to locate and extract any embedded decryption parameters in its file In further embodiments, the system can include an emulator to remove/locate decryption keys. The Abisko tools/implementation are configured to resolve the need to deal with packed/obfuscated TA tools. Various examples are configured to search and retrieve/reconstruct key that are not easily identified or extracted. According to some embodiments, the system and/or Abisko functionality is configured to execute an emulator and emulator OS APIs in order to run a TA tool within an emulated environment. The system and/or Abisko functionality is configured to monitor the execution in the emulated environment to detect when the TA tool has successfully de-obfuscated its data and/or accessed the needed encryption keys. Various embodiments are configured to execute a key extraction from the emulated memory once that state has been reached.

In other embodiments, the system and/or Abisko functionality is configured to provide configuration merging.

According to some examples, configuration merging through Abisko allows multiple keys from multiple ransomware variants to be held and executed via a single configuration file (e.g., even across multiple operating systems, and different variants). This enhanced functionality provides improve support for victims who had been encrypted with multiple variants of ransomware, or with multiple encryption keys over known conventional systems.

In some embodiments, the system and/or Abisko functionality is configured to validate and deliver triage configuration .dat files. The .dat files can then be used to validate the encryption integrity of encrypted files. For example, the improved functionality allows configuration .dat files to be delivered through a scalable automated web service, instead of requiring manual configuration of the computer settings or knowledge of the settings at all. This functionality improves over many conventional approaches providing validation functionality through an API.

According to some aspects, the Unidecrypt tool can be executed to attempt to undo encryption on any file it finds that is encrypted (e.g., excluding files with failed verifications). By default, the system can make a copy of the encrypted file, and decrypt the copied version. The system can also enable an overwrite mode to limit the storage utilization, where no copy is made of the encrypted file. Any errors can be tracked via a log file as well as any command line returns. In this review, the system can identify and correct files that are not actually encrypted. Some errors or failed decryptions can be addressed by subject matter experts, and failed attempts can be directed by the system to a resolution queue for further analysis. Any successes from the resolution queue can be used to update the Unidecrypt functionality, making the system more capable after each resolution. In various embodiments, the system can be configured to iterate resolution operations on any decryption failure, providing new solutions on prior failures, and even unlocking sequential or combinatorial solutions that would not be identified by conventional approaches. Such iterative solutions become part of the resolution library and can be identified and used in subsequent attacks having similar properties.

In some embodiments, the system can provide a "dry run" mode, which essentially runs through all files, and does not actually decrypt the file, but verifies if a file can be decrypted or not. If not, the system generates logging accordingly to establish reasoning for why not. This feature provides a meaningful enhancement over conventional systems. Generally speaking, computer admins are permitted by the system to execute dry runs or do quality assurance testing before any deployment to see in advance what the effect of execution and any changes may be. The dry run can include iterative decryption executions, trying various decryption operations iteratively on failed prior executions, among other options.

In further embodiments, the system can also provide an enhanced "extract mode," which allows partial recovery/ extraction of a given file. For example, if there is an error during a decrypt or verification, the system enables execution in the extract mode against that specific file to extract a portion of the file. This enables the system to troubleshoot on the extracted portion, providing the context for the failure, and sourcing information. Troubleshooting can then take place against a portion of the file that might be wrong or missing. In some examples, the extraction mode can operate on a variant by variant basis as the analysis can depend on the specific variant that is being analyzed.

For example, if the system detects a stream cipher, the system may not know if the decrypted output is gibberish, or not knowing what the file was before, but the system can be given information on other attributes (e.g., a certain number of chunks of a certain size and then run out of file before they get there). In other examples, if some data is missing in the footer, different plugins generate different error states and then trigger an extraction on the chunk where the system is encountering problems. Stated broadly, the system is configured to link an error state to a particular portion of the code and then depending on what variant and the state information, the system can take additional actions to either extract or manipulate the underlying data.

In various embodiments, adding Linux support to Unidecrypt has yielded improvements even over other system embodiments. For example, the addition of Linux support has yielded improvements in coverage over other examples. In various embodiments, the system provides tools that can be included in custom build containers that allow Unidecrypt to run on ESXi. As discussed herein, Unidecrypt defines data structures and functions that can be used to parse and verify sections of encrypted files prior to any decryption, and this extends to ESXi. Some embodiments package the extended implementation a product referenced as "Unitriage," given its wide applicability. As a result, knowledge about the specific details of a ransomware payload can be handled by the system when written into one code base rather than two. The system is configured to maintain and test one build toolchain to ensure compatibility with all of the operating systems that can be target for forensic resolution.

Further embodiments of the system and/or Unitriage functionality are derived from schemas definition for the configuration of each plugin (e.g., using the JSON Schema standardized format, among other options). In some examples, the schemas definitions are managed/served by Abisko functionality to consuming applications (e.g., via API), so that custom builds can be configured and tested against sample encrypted files in a friendly web UI with a fast turnaround time. This improves over known approaches that cannot handle multiple environments or multiple ransomware variants, and do not deliver such functionality as web accessible tools.

As discussed, the system can be configured to manage decryption on a plurality of operating platforms ("OSs"), including at least Microsoft OS, Apple OS, Linux OS, ESXi, or virtualized OS implementations. For example, the system can use custom implementation of various primitives to abstract away OS-specific behavior. In one embodiment, the system executes a custom set of cryptographic and file system primitives, that enable the system to perform cryptographic and filesystem operations independent of the OS on which they are executing. For example, this functionality enables the system to build an executable version of Unidecrypt for all supported platforms from the same source code, while providing feature parity between platforms. In some examples, Unidecrypt provides multiple implementations of some common utilities (like filesystem.cpp) with the same interface to accommodate for OS differences while keeping the plugin code OS-agnostic.

In other examples, the primitives are implemented to manage open, read, decrypt and write data such that implementation is OS agnostic. These functions are configured to provide an interface for ransomware variant decryption definitions regardless of OS. According to one example, the system uses a crypto.cpp, filesystem.cpp, filestream.cpp and fileverifier.cpp to encode the functions above (e.g., open, read, decrypt, write, etc.) are can be calls and executed in OS agnostics manner.

In some examples, the system can include a platform independent abstraction layer that, for example, allows the system to read/write file streams on a plurality of OSs. Other examples of abstraction layer functionality include file system enumeration. In other embodiments, the system employs a platform independent abstraction layer that is configured to provide file system enumeration functionality, and leverage that functionality to provide consistent operation across different operating systems. In one example, the file system enumerations is executed breadth first.

Further embodiments leverage the cryptographic and filesystem primitives to enable plugins that contain the decryption parameters and information within .dat files that can be interpreted by Unidecrypt builds for Windows, Linux or ESXi. For example, a Windows Unidecrypt build can decrypt files that were originally encrypted on a Linux system by using a .dat file that contains decryption parameters of the ransomware run on that Linux system. This functionality results from (in large part) by the custom primitives described above. Those primitives can be exported to any OS.

According to some embodiments, Unidecrypt is configured to not re-execute a decryption attempt if it fails with the given run time options. For example, if the .dat includes keys for multiple variants then Unidecrypt will execute using a different key/logic for the variants. In further embodiments, Unidecrypt confirms whether or not an expected output of a decryption attempt matches the expectations of the given encryption algorithm; which can be based, at least in part, on any one or more or any combination of the following: using file size, entropy checks, magic numbers and general pattern matching. If a decryption attempt fails any of the above checks, and there are multiple keys/parameters listed in the .dat then Unidecrypt is configured to try with the other keys until it exhausts the list or decryption is successful.

Various embodiments are tailored to perform more efficiently than conventional systems. For example, using existing hardware capabilities (for example hardware accelerated AES), the system enables highly parallelized decryption through the use of multi-threading and asynchronous I/O. The system can be configured to avoid unnecessary read/writes whereas most threat actor (TA) tools do not. The system is also configured to batch read/writes to optimize performance (for example instead of many small read/writes and single read/write). In some instances, the system can rely exclusively on breadth-first enumeration which is the most efficient algorithm for the problem of identifying encrypted files during decryption. Some specific implementations with very dramatic performance gains include Black-Basta, Ryuk, and Darkside TA decryptor tools. Performance gains under control/management of the system were measured 70%-80%. These performance gains do not include the total recovery time benefits enabled by the variety of run-time parameters available in Unidecrypt.

According to further embodiments, Unidecrypt uses automated unit tests to fully automate testing and verification of decryption correctness as part of the development lifecycle. Specifically, the system is configured to use virtual files to allow simulation of encrypted files of any size without having to provide actual real files that could take up excessive amounts of space. In some examples, these virtual files allow the system to inject the bits and parts required to decrypt into an otherwise sparse file that occupies little to no space, and for example, can exist just in memory. This is enabled even in circumstances where the virtual file size exceeds the amount of RAM available. The system manages any write operations to these virtual files based on recording them in a journal. The journal allows the system to precisely track and record that the data write commands issued by Unidecrypt match the write locations and contents of what a threat actor tool would have done to confirm correctness of the underlying operations.

Example Implementation: Decryption With Incremental Backup

According to some embodiments, the system can include enhancements that provide an overwrite mode called 'decryption with incremental backup.' With this feature the benefits of overwrite mode and file copy mode are combined to create backups of encrypted areas of the file before decrypting, and that allow the system to rollback any decryption operations that have been performed.

Example Implementation

Various embodiments are configured to handle massive volumes of forensic data captured from multitudes of sources at various times and under differing constraints. The captured forensic data can be processed with a highly scalable data pipeline configured to handle lists of forensic artifacts from various sets of endpoints. Various embodiments of the system are configured to process lists of forensic artifacts without upper bounds, for example, in terms of number of events per endpoint and number of endpoints. Some embodiments are configured to handle idempotent uploads from a single endpoint. Idempotent is a property where the effect of multiple identical requests is the same as the effect for a single request.

Due to the potentially highly sporadic nature of the forensic artifact collection process, the system can be further configured to minimize resource utilization which can be demonstrated in terms of carrying minimal maintenance, and in further example, providing minimal downtime and to reduce resource utilization so as to minimize processing costs. To enable the system to make processed results highly available (e.g., to dynamic queries constructed by forensic investigators (e.g., via a web application)), the system can be configured to make the final data store read performant, and in others enables functionality to swap processed results in and out of cold and hot storage. In other embodiments, the solution also had to meet stringent access, encryption and retention standards that can be set on the system, for example, by company policy. The system is configured to tailor operation to any specified constraints based on leveraging the logical separation of resulting data discussed herein. In some examples, the system manages bring your own key implementation where clients are able to specify their own encryption to be used. Other examples, include implementing client specific data retention policies, among other options.

Accordingly, the system is configured to leverage a suite of serverless cloud technology solutions to store, decrypt, analyze, enrich and query the data. The system can be configured to select/implement solutions based on standards or constraints defined on the system (e.g., described above).

Figure 7:
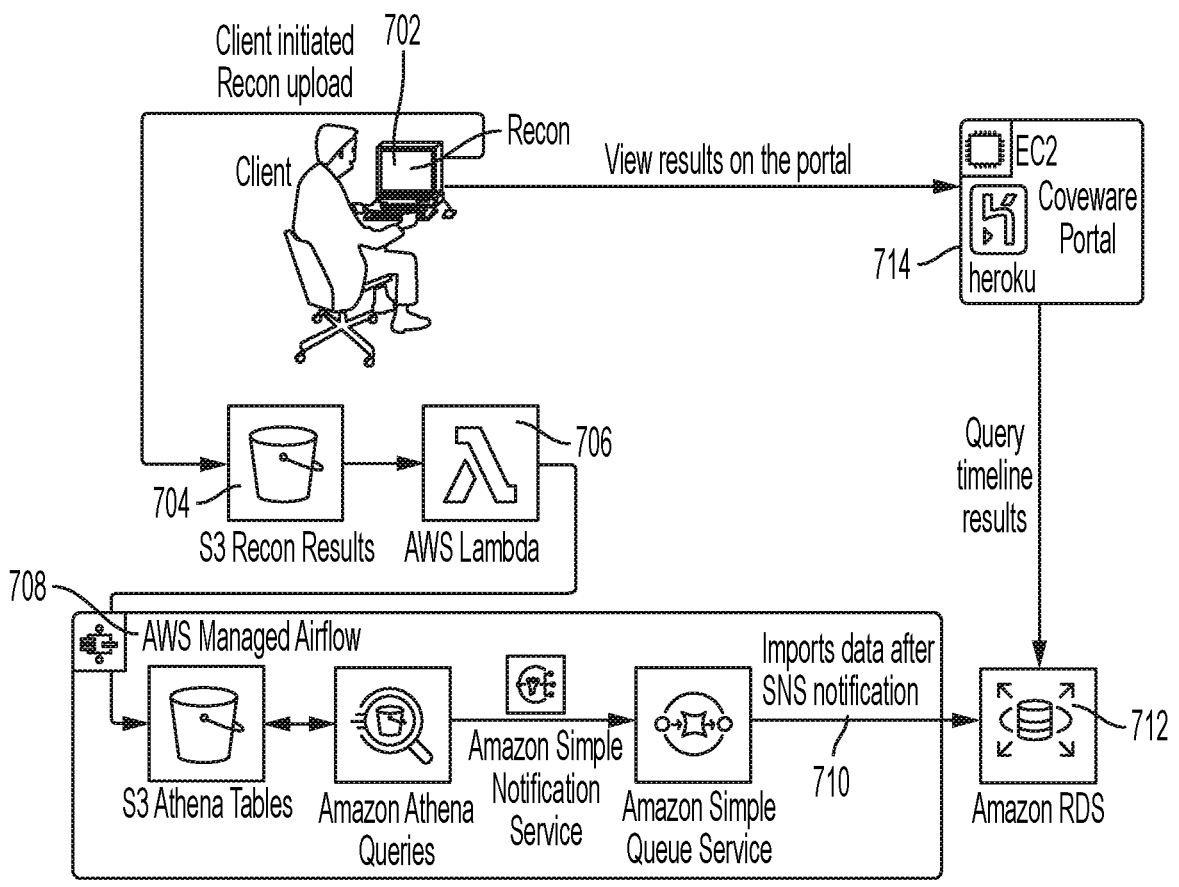
FIG. 7 is a block diagram of an example flow and system elements, according to one embodiment.

Shown in FIG. 7 is a process flow and system elements for executed at 702, the raw results are captured and communicated for storage at 704. The raw data can be encrypted and decrypted via a unique upload key for each per Recon build or forensic project. In some examples, the system builds infrastructure and security boundaries for each forensic review projection that can be referred to as a Recon build. Processing of the results can be performed utilizing a host of cloud compute resources, which can be assigned on demand and/or according to the size of the project/volume of data to process (e.g., at 706). The processing (block 708) includes analyzing the raw data results using a series of AWS MWAA Directed Acyclic Graphs (DAGs). These DAGs orchestrate a series of functions to filter, deduplicate, enrich and format the lists of forensic artifacts identified in the raw data. Filter operations are executed as part of translating the raw data into specific events that are linked to EventActivity Fields displays for forensic analysis. The system is configured to translate different pieces of artifacts (e.g., raw forensic data) into an EventActivity field for easy display. In various embodiments, the system constructs DAGs that capture an observed event and encode the pieces most interesting into nodes on the DAG, which enables succinct presentation is a display for any forensic investigator doing the analysis. For example, a services installed graph encodes multiple fields from the "service installed" query. In addition, the system can build DAGS based on the following event types: program execution prefetch, file access, program execution, Ink file access, scheduled tasks, log errors, log file creation/deletion, among other options. The system leverages the DAG to provide a summarized, single, human-readable, and searchable field.

Various embodiments provide for the various process executions to leverage scalability and the minimization of resources used to maintain the system for subsequent forensic or ransomware resolution actions. For example, the system only requires compute resources when data is not being processed for storage which can be swapped between hot/cold data stores. Various embodiments leverage such efficiency and data structures to provide improvements over known approaches (including for example, the systems focus application on ransomware incident response).

As mentioned above, query executions are joined against the system IOC tables/libraries so that the system can easily identify known bad activity identified from previous cases, among a host of other efficiencies provided.

Once processing in block 708 is complete, the final node leverages Amazon SQS to import (e.g., at 710) the processed results into Amazon relational database service ("RDS") where the processes data (e.g., transformed from raw format into queryable format) is made available for further queries or action taken by the backend of application of the Coveware Portal. Once uploaded to RDS, a scheduled DAG consolidates new endpoint result sets from SQS at the case level (e.g., case ID for each Recon build) and notifies the web application (e.g., back end) that new results are available for displaying and querying.

According to some embodiments, the system's operational performance has been benchmarked against known threat actor solutions or tools. In one example execution, the system decrypts data 374% times faster for the known HIVE threat actor tool and 52% faster for the known BLACKCAT ADLPHV threat actor tool. Benchmarking analysis has demonstrated for various implementations, and for example, those covering large environments (e.g., large number of systems) improved operation and efficiency that can eliminate days of processing required by conventional approaches.

Various embodiments are configured to enhance performance over known approaches, improve usability, and reduce risk in resolving ransomware attacks. The improved execution and operation ultimately yields reductions in the costs of business interruption owing to the improved technical implementation. According to some embodiments, the unidecrypt functionality is configured to run using keys extracted from threat actor functionality and/or tools. In further example, the unidecrypt functionality can also operate against keys extracted from other threat actor tools and integrate them into a holistic solution. As discussed herein, various embodiments operate regardless of an underlying encryption schema and the ingested keys used are compatible irrespective of format enabling clients to benefit from the safety and efficiency of a high fidelity decryption execution.

In various embodiments, the system provides safety constraints such that it is no longer necessary to reverse engineer a threat actor's decryptor or even be concerned about embedded malware or backdoors that may lead to a second compromise. In some examples the system is configured to identify embedded malware, backdoors, or other compromise vectors as part of decryption and/or resolution of a ransomware attack. For example, the system can segregate recovered information automatically (e.g., sandbox storage, environment, etc.), and/or run malware detection, leverage library information on expected malware, back doors or other compromise vectors, among other options. In further embodiments, the system is configured to provide several different modes for decryption and can enable end-users to select from the different modes depending on how the recovery approach is meant to be staged. In one example, the system can permit selection of safety protocols associated with recovered data to ensure no secondary compromise results.

Still other embodiments leverage a library of threat actor information, ransomware variants, decryption metadata, among other options, and the library is maintained on a daily basis to provide for information on the most recent variant and any changes or modifications to known variant. The library can include information that matches a current ransomware attack to backdoors built into recovered information, or malware embedded in recovered files, data, etc. The library enables the system to leverage knowledge gleaned in one attack (and for examples operating system context) on other attacks and, for example, even across different operating system contexts.

According to various embodiments, the system build metadata and operating system primitives that provide functionality that is leveraged across various operating systems. In various embodiments, the system executes an independent abstraction layer that, for example, enables the system to read/write file streams on a plurality of operating systems. Other examples of abstraction layer functionality include file system enumeration regardless of operating system.

According to one example, the system is able to learn about a ransomware attack, variant, compromise vector, in a first operating system setting and leverage the information collected for any of the resolutions identified in other operating system contexts. Stated broadly, the system is able to learn once (e.g., in a specific environment) and use the functionality developed in other environments. For example, the library of covered variants is updated daily as new variants emerge and spans multiple operating systems regardless of where (e.g., operating system) an initial resolution is identified.

As part of the feature suite, the system is configured to automatically create a backup copy of all encrypted data, include any network drives, delete encrypted files, target decrypted file outputs, and/or operate in a single threaded mode. Each of these features can be selected as a command line switch among other options. Further functionality includes mass deployment operations which allow the use of SCCM, PS EXEC, power shell or any internal RMM to mas deploy across all endpoints (e.g., simultaneously). Some embodiments provide access to functionality via command line interface or graphical user interface. The command line interface is configured to provide a consistent interface to end users so that the same parameters perform in the same manner across all supported variants and operating systems. In further example, the system is configured to provide consistent outputs that enable efficient troubleshooting and associated displays whenever necessary. In other examples, the system is configured to provide multi-key support for any ransomware project, eliminating the need for users to manage multiple keys or select specific keys for specific files. In still other examples, the system is configured to provide multilayer support which enables, for example, resolution of multiple layers of encryption (e.g., even different variants, on instance encrypted with multiple keys) in one run.

According to various implementations, the system provides for forensic resolution that is achievable in a fraction of the time associated with conventional forensic investigation. For example, deployment and collection functionality can be mass deployed to any number of endpoints and uses a scalable data pipeline to provide forensic data sometimes even weeks before conventional approach can begin to return analysis. The data is processed so that analysis and visualization is returned in real or near real time and critical questions can be answered quickly and efficiently based on the returned analysis and visualizations. The efficiencies achieved by scaling the functionality and providing consistent universal support reduces the computational burden associated with conventional approaches and ultimately yields a low cost solution when compared to traditional forensic investigation (reflective of the improved technical features). The efficiencies achieved also provide immediate answers to client questions, bespoke visualizations for non-technical users that summarize technical issues, and that also provide deliverables that match the urgency required for forensic resolution.

Figure 10:
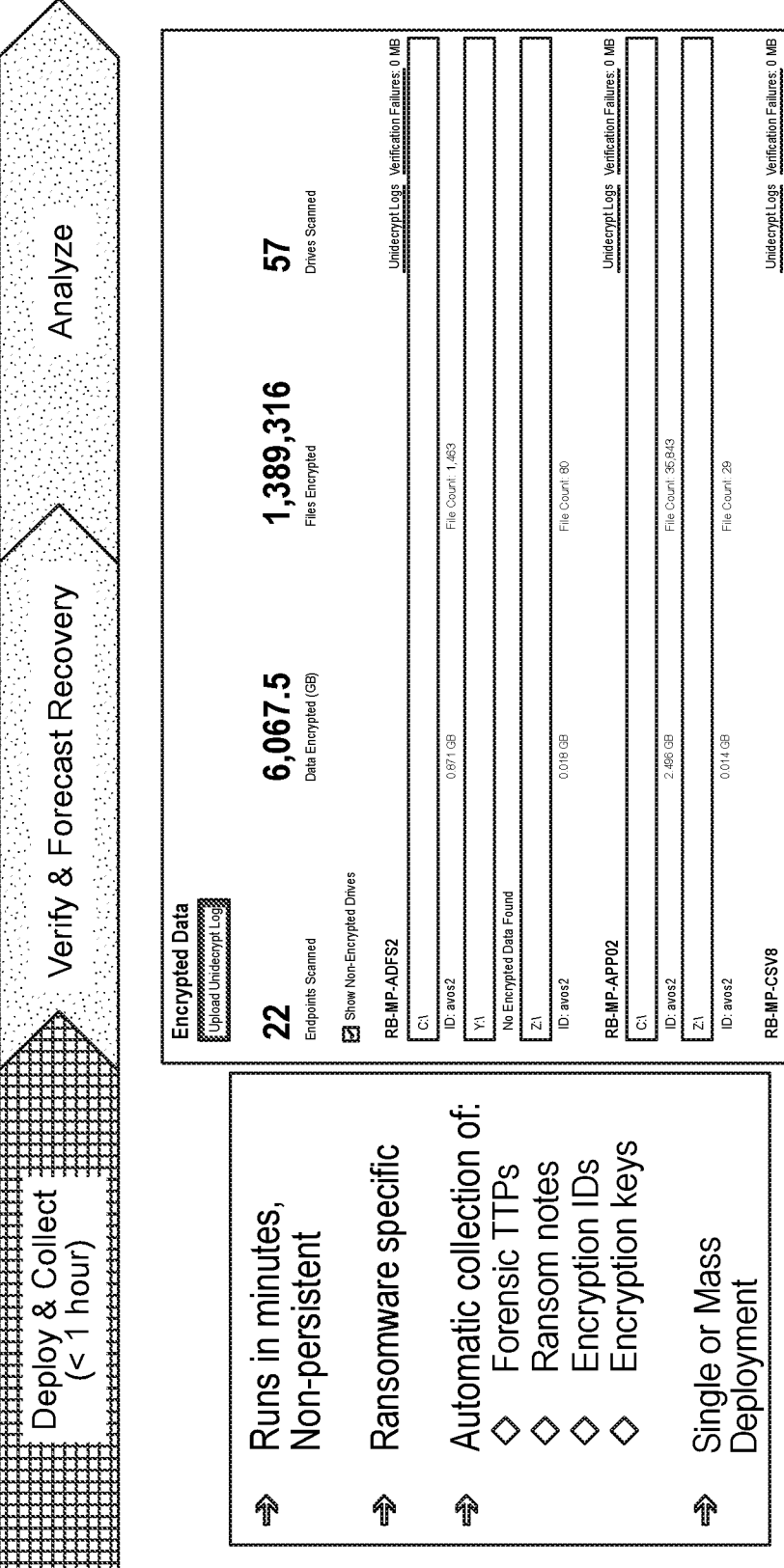
FIG. 10 is an example analysis and interface display, according to one embodiment.

FIG. 10 shows an example analysis and interface display provided by the system. Further, FIG. 10 illustrates benchmark operational parameters that show improved operation over conventional approaches. For example, the data collection operation (e.g. deploy/collect stage) was executed in minutes for this example project. The system display analysis results that are ransomware specific, and that include forensic tactics, techniques, and procedures (TTP's), ransom notes, encryption IDs, and encryption keys that can be performed as a single or mass deployment across any number of endpoints on potentially compromised systems.

FIG. 11 illustrates a verify and forecast recovery stage. During this stage of operation various embodiments of the system are configured to identify corruption or non-encrypted files, catalog all systems and volumes that are impacted, and/or forecasted data recovery options at the file level that allow end-users to adjust or pivot a recovery strategy. The example interface is generated by system and displayed to end users to show verification failures (e.g., likely to be unrecoverable).

Figure 12:
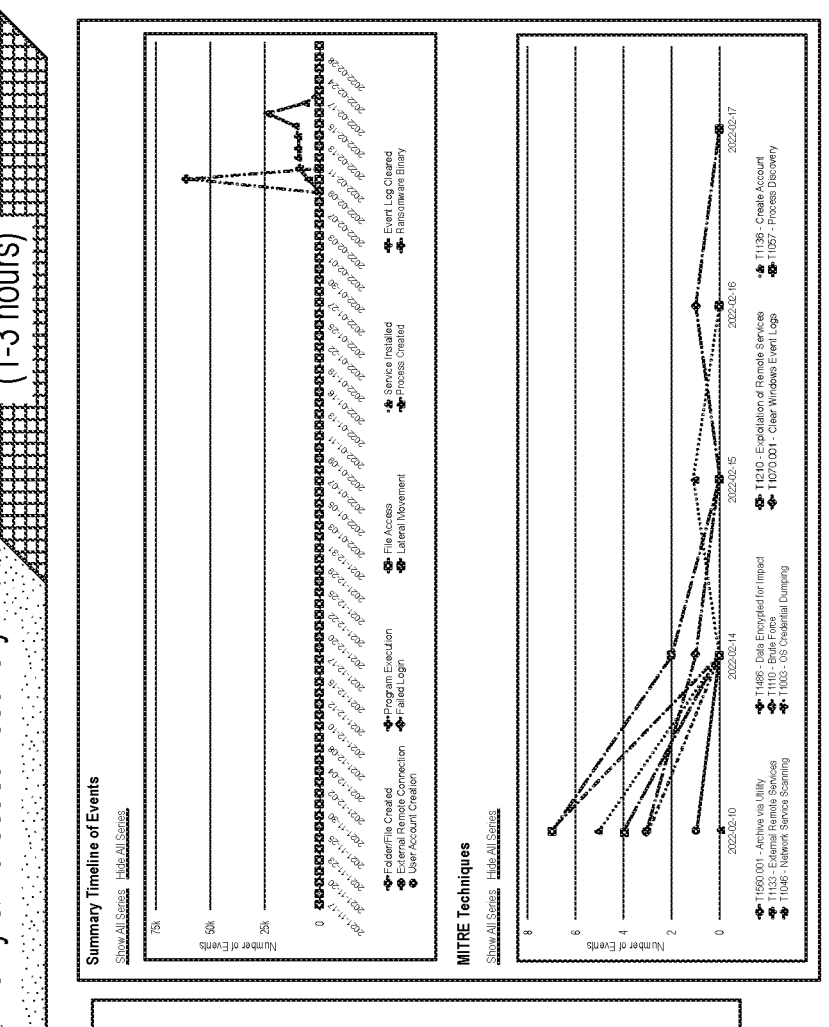
FIG. 12 is an example analysis and interface display, according to one embodiment.

FIG. 12 illustrates an example analyze stage and provides an example timeframe for its execution. For example, a visualization of a timeline of events during an attack can be shown as well as a visualization of all known MITRE events/techniques that further allow users to select within the timeline visualization to look at specific events or operations that may have led to compromise. As shown, an attack timeline is re-created and visualized to enable even non-technical viewers to readily understand the specific events that led to or are part of a ransomware attack. In various examples, the forensic triage data is mapped to tactics, techniques, and procedures that apply to the specific events shown in the timeline or identified MITRE events shown in the timeline. As discussed herein, such analysis can be delivered in minutes or hours as opposed to weeks typically required by conventional approaches. As part of the visualizations, detection and mitigation guidance can be provided for the identified events or more generally for specific ransomware attacks among other options.

Figure 6:
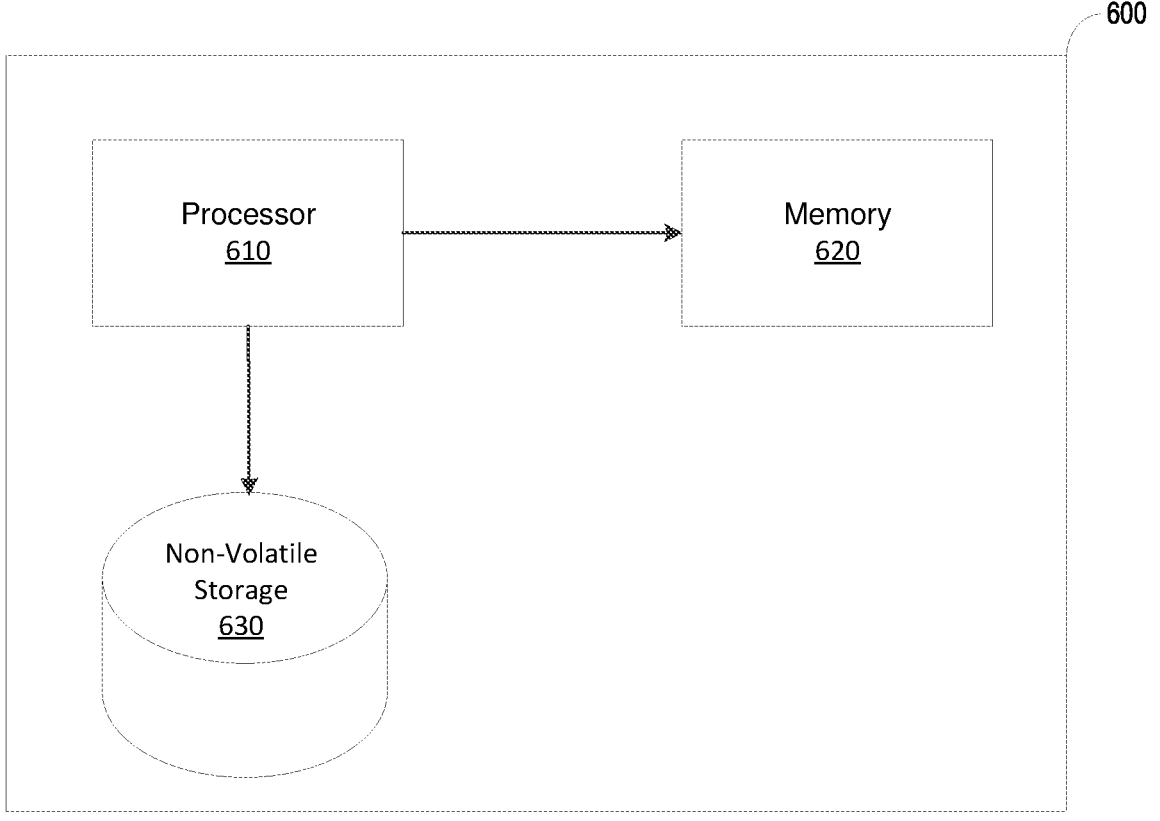
FIG. 6 is a block diagram of an example special purpose computer system improved by implementation of the functions, operations, and/or architectures described herein.

FIG. 6 is a block diagram of an example computer system that is improved by implementing the functions, operations, and/or architectures described herein. Modifications and variations of the discussed embodiments will be apparent to those of ordinary skill in the art and all such modifications and variations are included within the scope of the appended claims. Additionally, an illustrative implementation of a computer system 600 that may be used in connection with any of the embodiments of the disclosure provided herein is shown in FIG. 6. The computer system 600 may include one or more processors 610 and one or more articles of manufacture that comprise non-transitory computer-readable storage media (e.g., memory 620 and one or more non-volatile storage media 630). The processor 610 may control writing data to and reading data from the memory 620 and the non-volatile storage device 630 in any suitable manner. To perform any of the functionality described herein (e.g., image reconstruction, anomaly detection, etc.), the processor 610 may execute one or more processor-executable instructions stored in one or more non-transitory computer-readable storage media (e.g., the memory 620), which may serve as non-transitory computer-readable storage media storing processor-executable instructions for execution by the processor 610.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationships between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described herein) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

In other embodiments, various ones of the functions and/or portions of the flows discussed herein can be executed in different order. In still other embodiments, various one of the functions and/or portions of the flow can be omitted, or consolidated. In yet other embodiments, various one of the functions and/or portions of the flow can be combined, and used in various combinations of the disclosed flows, portions of flows, and/or individual functions. In various examples, various screens, functions and/or algorithms can be combined, and can be used in various combinations of the disclosed functions.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for managing cyberattacks, the system comprising:

at least one processor operatively connected to a memory, the at least one processor configured to:

instantiate a web based application, the web based application configured to:

access a plurality of threat actor tools via a plurality of application programming interfaces (APIs) tailored to respective ones of the threat actor tools, wherein each API of the plurality of APIs is configured to identify regular expressions, patterns, or emulated behaviors within data of a respective threat actor tool, match activity to indicators of compromise (IOC), and capture data from the respective threat actor tool associated with the IOC;

leverage the data produced by a threat actor tool in the plurality of threat actor tools;

encode the data produced by the threat actor tool in the plurality of threat actor tools as nodes in a directed acyclic graph; and construct decryption parameters for decrypting ransomed files and generate a first file for storing and accessing associated decryption key information, and a second file for storing and accessing ransomware variant(s) specific parameters for executing decryption.

2. The system of claim 1, wherein the at least one processor is configured to:

extract encryption key material from the plurality of threat actor tools; and store the encryption key material with an association with an IOC or MITRE resolution.

3. The system of claim 2, wherein the at least one processor is configured to maintain a library of knowledge including identified solutions or remediations and association with respective malware, a respective attack, respective ransomware, or respective threat actor profiles.

4. The system of claim 3, wherein the at least one processor is configured to generate a JavaScript Object Notation (JSON) and DAT format file output to enable confirmation of a presence of extracted keys.

5. The system of claim 1, wherein the at least one processor is configured to:

capture a memory dump created via execution of a threat actor tool of the plurality of threat actor tools, and manage execution of the threat actor tool within a controlled environment or through an emulation process in which the threat actor tool is executed.

6. The system of claim 5, wherein the controlled environment or the emulation process in which the threat actor tool is executed enables capture of execution information in the controlled environment or the emulation process.

7. The system of claim 5, wherein the at least one processor is configured to execute subroutines configured to emulate or replicate parsing behavior for a target threat actor tool of the plurality of threat actor tools that the target threat actor tool executes to locate and extract any embedded decryption parameters.

8. The system of claim 1, wherein the at least one processor is configured to enable configuration merging across multiple encryption variants based on providing multiple decryption keys associated with multiple independent ransomware variants in the merged configuration.

9. The system of claim 1, wherein the at least one processor is configured to manage single triage configuration configured to validate an encryption integrity of encrypted files across a plurality of ransomware variants and/or operating system environments.

10. A computer implemented method for managing cyber-attacks, the method comprising:

instantiating, by at least one processor, a web based application, the web based application; and accessing, by the web based application, a plurality of threat actor tools via a plurality of application programming interfaces (APIs) tailored to respective ones of the threat actor tools, wherein each API of the plurality of APIs is configured to:

identify regular expressions, patterns, and/or emulated behaviors within output data of a respective threat actor tool;

match activity to indicators of compromise (IOC), and capture data from the respective threat actor tool associated with the IOC;

leverage the data produced by a threat actor tool in the plurality of threat actor tools;

encode the data produced by the threat actor tool as nodes in a directed acyclic graph; and capture parameters for decrypting ransomed files and generate a first file for storing and accessing associated decryption key information, and a second file for storing and accessing ransomware variant(s) specific parameters for executing decryption.

11. The method of claim 10, further comprising:

extracting encryption key material from the plurality of threat actor tools; and storing the encryption key material with an association with an IOC or MITRE resolution.

12. The method of claim 11, further comprising maintaining a library of knowledge including identified solutions or remediations and association with respective malware, a respective attack, respective ransomware, or respective threat actor profiles.

13. The method of claim 12, further comprising generating a JavaScript Object Notation (JSON) and DAT format file output to enable confirmation of a presence of extracted keys.

14. The method of claim 10, further comprising:

capturing a memory dump created via execution of a threat actor tool of the plurality of threat actor tools; and managing execution of the threat actor tool within a controlled environment or through an emulation process in which the threat actor tool is executed.

15. The method of claim 14, further comprising capturing execution information in the controlled environment or the emulation process via the controlled environment or the emulation process in which the threat actor tool is executed.

16. The method of claim 14, further comprising executing subroutines configured to emulate or replicate parsing behavior for a target threat actor tool of the plurality of threat actor tools that the target threat actor tool executes to locate and extract any embedded decryption parameters.

17. The method of claim 10, further comprising enabling configuration merging across multiple encryption variants based on providing multiple decryption keys associated with multiple independent ransomware variants in the merged configuration.

18. The method of claim 10, further comprising managing single triage configuration files configured to validate an encryption integrity of encrypted files across a plurality of ransomware variants and/or operating system environments.

* * * * *